(12) United States Patent
Bloomfield et al.

(10) Patent No.: US 10,282,867 B2
(45) Date of Patent: May 7, 2019

(54) SHADING FOR VARIABLE OPACITY STROKE RENDERING

(71) Applicant: Microsoft Technology Licensing, LLC, Redmond, WA (US)

(72) Inventors: Jeffrey Ryan Bloomfield, Redmond, WA (US); Nicholas Defay Feeney, Bothell, WA (US); David Foster Spruill, Redmond, WA (US); Anthony John Rolls Hodsdon, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 108 days.

(21) Appl. No.: 15/382,208

(22) Filed: Dec. 16, 2016

(65) Prior Publication Data

US 2017/0278275 A1    Sep. 28, 2017

Related U.S. Application Data

(60) Provisional application No. 62/313,700, filed on Mar. 25, 2016.

(51) Int. Cl.
*G06T 11/00* (2006.01)
*G06T 11/20* (2006.01)
(Continued)

(52) U.S. Cl.
CPC ........ *G06T 11/001* (2013.01); *G06F 3/04883* (2013.01); *G06F 17/242* (2013.01);
(Continued)

(58) Field of Classification Search
CPC ....... G06T 11/40; G06T 11/203; G06T 17/30; G06T 11/001; G06F 3/04845; G06F 17/17; G09G 5/20
See application file for complete search history.

(56) References Cited

U.S. PATENT DOCUMENTS 5,175,625 A * 12/1992 Miles .................. G06F 3/04845
                                                    345/173
5,367,617 A    11/1994 Goossen et al.
(Continued)

FOREIGN PATENT DOCUMENTS

CN        101699516 A    4/2010
CN        102509357 A    6/2012
(Continued)

OTHER PUBLICATIONS

International Search Report and Written Opinion Issued in PCT Application No. PCT/US2017/023279, dated Jun. 16, 2017, 17 Pages.
(Continued)

*Primary Examiner* — Todd Buttram
(74) *Attorney, Agent, or Firm* — Newport IP, LLC; Han Gim

(57) ABSTRACT

A touch input is received on the touchscreen. The touch input comprises a stroke and is associated with variable opacity. The stroke is converted to a plurality of segments. The plurality of segments comprises a plurality of arc segments, line segments, or a combination. A plurality of stamps is generated corresponding to the plurality segments. Shading is applied to the stroke, where applying shading comprises varying at least one of a weight or an offset of at least one color associated with at least one pixel of at least one stamp of the plurality of stamps. The plurality of stamps is rendered on the touchscreen of the device to represent the stroke.

16 Claims, 12 Drawing Sheets

(51) Int. Cl.
*G06K 9/22* (2006.01)
*G06F 3/0488* (2013.01)
*G06F 17/24* (2006.01)
*G06K 9/00* (2006.01)

(52) U.S. Cl.
CPC ......... *G06K 9/00416* (2013.01); *G06K 9/222* (2013.01); *G06T 11/203* (2013.01)

(56) References Cited

U.S. PATENT DOCUMENTS

| | | | |
|---|---|---|---|
| 5,767,860 | A | 6/1998 | Zimmer et al. |
| 5,835,086 | A * | 11/1998 | Bradstreet ............ G06T 11/001 345/581 |
| 5,847,712 | A | 12/1998 | Salesin et al. |
| 5,999,190 | A * | 12/1999 | Sheasby ................ G06T 11/00 345/589 |
| 6,137,500 | A * | 10/2000 | Silverbrook ............ G06F 21/79 345/442 |
| 6,356,271 | B1 * | 3/2002 | Reiter .................... G06T 15/04 345/582 |
| 6,373,490 | B1 * | 4/2002 | Bendiksen ............ G06T 11/001 345/441 |
| 6,970,169 | B1 | 11/2005 | Harris |
| 7,190,375 | B2 | 3/2007 | Dresevic et al. |
| 7,266,769 | B2 | 9/2007 | Thacker |
| 7,714,866 | B2 | 5/2010 | Sander |
| 8,081,187 | B2 | 12/2011 | Perani et al. |
| 8,289,341 | B2 | 10/2012 | Sarel et al. |
| 8,296,668 | B1 | 10/2012 | Song et al. |
| 8,379,047 | B1 | 2/2013 | DiVerdi |
| 8,698,808 | B2 | 4/2014 | Kilgard |
| 8,766,982 | B2 | 7/2014 | Noris et al. |
| 8,847,961 | B2 | 9/2014 | Marison |
| 8,988,461 | B1 | 3/2015 | Schmid et al. |
| 9,058,680 | B2 | 6/2015 | Stamoulis et al. |
| 9,268,418 | B2 | 2/2016 | DiVerdi et al. |
| 9,448,648 | B2 | 9/2016 | Angelov et al. |
| 2008/0117214 | A1 * | 5/2008 | Perani .................. G06T 11/206 345/441 |
| 2011/0249007 | A1 | 10/2011 | Kuster et al. |
| 2012/0075310 | A1 | 3/2012 | Michail et al. |
| 2013/0027404 | A1 * | 1/2013 | Sarnoff .................... G06T 1/20 345/441 |
| 2013/0120426 | A1 * | 5/2013 | DiVerdi ................ G06T 11/001 345/589 |
| 2013/0127898 | A1 * | 5/2013 | DiVerdi ................ G06T 11/203 345/600 |
| 2014/0081610 | A1 | 3/2014 | DiVerdi et al. |
| 2014/0240322 | A1 * | 8/2014 | Brumer ................ G06T 11/203 345/442 |
| 2015/0062124 | A1 | 3/2015 | Goel et al. |
| 2015/0153852 | A1 | 6/2015 | DiVerdi et al. |
| 2015/0378450 | A1 * | 12/2015 | Petkov ................ G06Q 10/101 345/442 |
| 2016/0042534 | A1 | 2/2016 | Tremblay et al. |
| 2016/0078649 | A1 * | 3/2016 | Bonacina ............ G06T 11/203 345/442 |
| 2016/0078651 | A1 | 3/2016 | Asher |

FOREIGN PATENT DOCUMENTS

| | | |
|---|---|---|
| CN | 103679794 A | 3/2014 |
| EP | 1950705 A2 | 7/2008 |
| GB | 2244895 A | 12/1991 |
| GB | 2248754 A | 4/1992 |

OTHER PUBLICATIONS

Hughes, et al., "Rendering with a Rasterization API", In book Computer Graphics: Principles and Practice, 3rd Edition, Aug. 2, 2013, 11 Pages.

Riskus, Aleksas, "Approximation of a Cubic Bezier Curve by Circular Arcs and Vice Versa", In Information Technology and Control, vol. 35, Issue 4, Oct. 1, 2017, 8 Pages.

International Search Report and Written Opinion Issued in PCT Application No. PCT/US2017/023490, dated Jun. 19, 2017, 18 Pages.

Murakami, et al., "Multiple Illuminated Paper Texture for Drawing Strokes", In Proceedings of IEEE International Computer Graphics, Jun. 22, 2005, 6 pages.

Begbie, Caroline, "Apple Pencil Tutorial: Getting Started", https://www.raywenderlich.com/121834/apple-pencil-tutorialf, Published on: Jan. 5, 2016, 16 pages.

Weins, Connor, "Digital Ink—Ink Interaction in Windows 10", http://web.archive.org/web/20160130152415/https:/msdn.microsoft.com/en-us/magazine/mt590975.aspx, Published on: Jan. 30, 2016, 13 pages.

Bert Freudenberg, "Real-Time Stroke Textures", In Technical Sketch of Conference Abstracts and Applications, Aug. 12, 2001, 1 pages.

Mastering Pencil By Fiftythree, https://mademistakes.com/mastering-paper/pencil/, Retrieved on: Dec. 1, 2016, 32 pages.

Kovacs, et al., "Making Fiftythree The Precision Behind Blend", http://making.fiftythree.com/the-precision-behind-blend/, Published on: Jul. 24, 2014, 6 pages.

"Alpha Compositing—Wikipedia, The Free Encyclopedia", Retrieved from <<http://web.archive.org/web/20120621024348/https://en.wikipedia.org/wiki/Alpha_compositing>>, Mar. 3, 2016, 6 Pages.

"Compositing and Blending Level 1", Retrieved from <<https://www.w3.org/TR/compositing/>>, Jan. 13, 2015, 22 Pages.

Giannattasio, Tom, "Brushing Up on the Photo Shop Brush Tool", Retrieved from <<https://www.smashingmagazine.com/2009/11/brushing-up-on-photoshops-brush-tool/>>, Nov. 16, 2009, 28 Pages.

"International Search Report and Written Opinion Issued in PCT Application No. PCT/US2017/023491", dated Oct. 25, 2017, 26 Pages.

"Non-Final Office Action Issued in U.S Appl. No. 15/381,890", dated Feb. 8, 2018, 20 Pages.

Chatterjee, et al., "A Simulation of Realistic Sketching by Randomized Pencil Strokes", In Proceedings of IEEE Students' Technology Symposium, Jan. 14, 2011, 3 pages.

Lee, et al., "Real-Time Pencil Rendering", In Proceedings of the 4th International Symposium on Non-Photorealistic Animation and Rendering, Jun. 5, 2006, 9 pages.

Colubri, Andres, "Shaders", http://web.archive.org/web/20130610070413/http:/www.processing.org/tutorials/pshader, Published on: Jun. 10, 2013, 27 pages.

"Pen Interactions and Windows Ink in Uwp Apps", https://msdn.microsoft.com/en-us/windows/uwp/input-and-devices/pen-and-stylus-interactions, Published on: Nov. 23, 2016, 17 pages.

* cited by examiner

SHADING FOR VARIABLE OPACITY STROKE RENDERING

TECHNICAL FIELD

This disclosure relates generally to rendering of finger or pen text and other input on touchscreen devices, and more specifically to providing a pencil-style or other variable opacity stroke for more natural-media writing, sketching, etc.

BACKGROUND

Users of pen-enabled devices that interface with touchscreens or digitizers have become accustomed to high fidelity, low latency ink rendering that leverages a GPU-accelerated solid-color "pen" style ink effect. However, these pen-style effects only provide a solid color, and do not accurately represent writing or drawing with other writing instruments such as pencils and the like. The next step is to provide customers with a "pencil" style ink effect, but this requires a new and unique rendering technology in order to provide a natural and realistic look and feel, whilst preserving the low latency and high performance of the existing solid-color ink effect. Accordingly, improvements can be made in the field of pen or finger entry via touchscreen or digitizer devices.

SUMMARY

Illustrative examples of the disclosure include, without limitation, methods, systems, and various devices for rendering variable opacity ink strokes on a touchscreen device. In one aspect, rendering variable opacity ink strokes may include receiving a touch input including a stroke associated with variable opacity, and converting the stroke to a plurality of segments, including arc segments, line segments, or a combination thereof. A plurality of stamps corresponding to the plurality segments may be generated. Shading may be applied to the stroke. In an embodiment, shading may comprise varying at least one of a weight or an offset of at least one color associated with at least one pixel of at least one stamp of the plurality of stamps. The plurality of stamps may be rendered on the touchscreen of the device to represent the stroke.

Other features of the systems and methods are described below. The features, functions, and advantages can be achieved independently in various examples or may be combined in yet other examples, further details of which can be seen with reference to the following description and drawings.

BRIEF DESCRIPTION OF THE DRAWINGS

Embodiments of the present disclosure will be described more fully hereinafter with reference to the accompanying drawings, in which.

DETAILED DESCRIPTION OF ILLUSTRATIVE EMBODIMENTS

Figure 1:
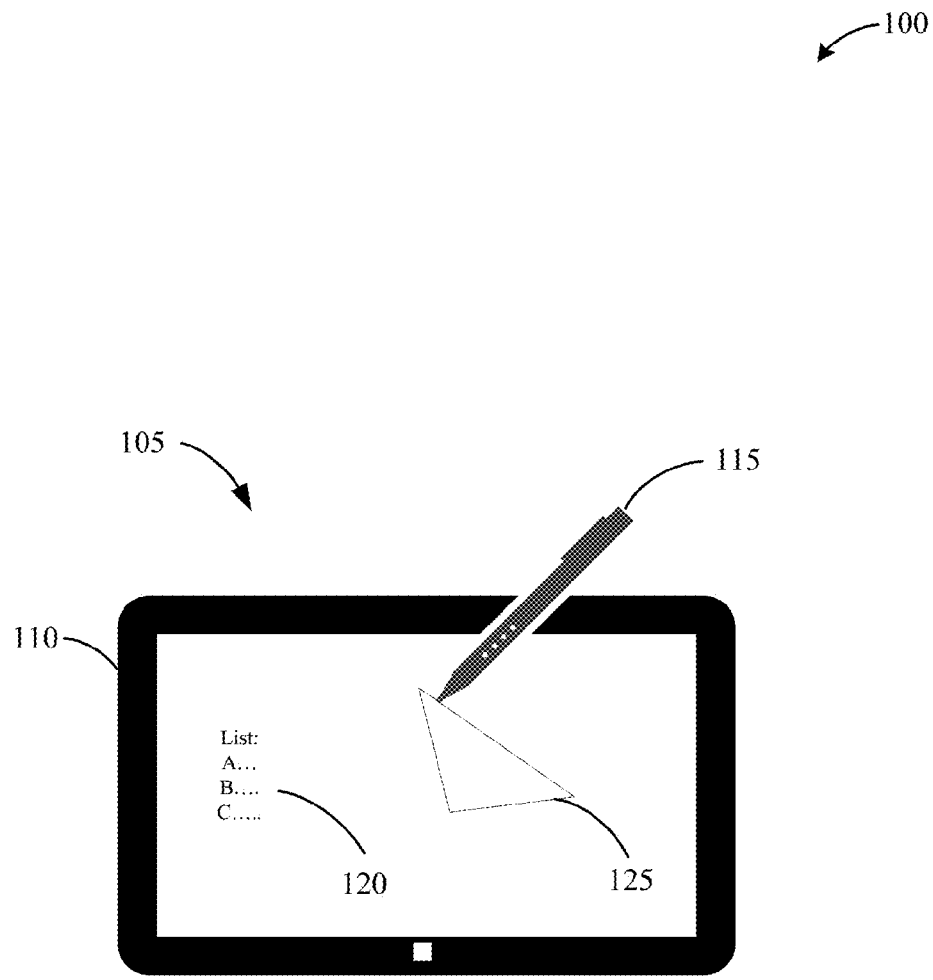
FIG. 1 illustrates an example system for receiving and rending solid and variable opacity strokes.

Systems and techniques are described herein for rendering lines, points or dots, and other input (generally referred to herein as strokes) having variable opacity onto a touchscreen or digitizer device (herein referred to collectively as a touchscreen device), for example, based on movements of a stylus or pen, finger of a user, or other writing implement. In some aspects, the described techniques may provide rendering of input (e.g., strokes) that simulate or represent a pencil, chalk, crayons, charcoal, or other physical writing implement. The described techniques may be implemented as an extension to an existing API or as its own API that provides an interface between an application and a device which may be touchscreen enabled. A user interface (UI) may be provided that enables selection of different types of virtual writing styles, with the selection modifying the various rendering techniques used to display the input on the touchscreen device.

In some aspects, a GPU-enabled API may be configured to render pencil ink strokes, such as lines, dots, etc., that have varying opacity and other characteristics normally associated with physical pencil writing and drawing. The rendering techniques described herein may include processing pencil strokes as arc and line segments, for example, converted from Bezier curves generated based on received input on a touchscreen device or other input device. In some aspects, the rendering techniques may include rearranging stamps used to represent the stroke by evaluating weight contributed by a stroke to a pixel. In some aspects, the rendering techniques may additionally or alternatively include evaluating texture contributions stamp by stamp. The rendering may also include evaluating texture contribution using paper texture and noise based on stroke size, pressure, and/or coordinates.

In some existing pen-enabled devices and applications, strokes may be represented by Bezier-curves. Some pen-enabled applications support variable-width ink strokes, which improves the visual appearance in handwriting inking scenarios while using these applications. The techniques described herein take those improvements farther, by enabling and providing additional ink strokes that are not limited to solid color. The described techniques can thus greatly improve the utility of touchscreen and other pen-enabled devices to include more creative-type drawing scenarios, such as sketching or natural-media type writing with pencil-type input and rendering, coloring with variable darkness, hue, or other visual characteristics associated with physical writing implements such as crayons, colored pencils, and even various types of paint, such as water-color, oil, and so on. From a high level, the described techniques support these various ink styles by moving away from previous vector-based techniques. The described techniques may be added as features to various applications and computing environments, such as drafting applications, note-taking applications, and even operating systems generally.

The described techniques may include combining paper texture(s) with gradually-varying noise to create a feel similar to writing with pencil on paper that has some texture (more life-like experience), instead of using fixed textures which may yield a poor visual appearance, or using stamps that each have a unique or randomized shape and/or texture, which may have issues with scaling and latency. The described techniques may additionally or alternatively include using empirical heuristics for scaling, weighting, and merging the noise and texture based on stroke size, pressure, and location within the stroke (how far the writing implement is relative to the total stroke length). In some aspects, blending manipulation, which may include stamp rearranging, may be used, for example, to help minimize artifacts that appear after retracing or overlapping part of a previous stroke. Some or all of these features may be provided by converting the strokes (received touch input on a touchscreen device) into arc segments, as will be described in greater detail below.

FIG. 1 illustrates an example system 100 for receiving and rendering ink strokes, and more specifically pencil or other strokes having variable opacity. System 100 may include a computing device 105 having a touchscreen 100 that detects touch input, for example, from a stylus 115 or other writing implement, such as a finger of a user. The touch input may be received through the touchscreen 110 and subsequently rendered as strokes, which may include text 120 and/or drawing or other graphical elements 125, including any of a variety of shapes, colors, etc. Via one or more selections, for example, that may be provided through a user interface associated with a drawing or note-taking application, a pencil or other variable opacity stroke type may be selected. The selection of a pencil or other variable opacity stroke or writing type or style may enable the described rendering techniques, as will be described in greater detail below, for displaying variable opacity strokes.

In some aspects, the described techniques may involve modeling and rendering strokes on a touchscreen device to simulate a real-world experience, but may not model the inputs in way as to emulate physical writing, for example, on disposable media such as paper.

The described techniques may operate in conjunction with current ink-stroke or digital ink type applications, which may take into account one or more of the following considerations: performance, scaling, latency, variable width strokes, blending, and repeatability. Performance: an application using the described techniques may re-render strokes each frame, for example, in a system compositor. This design may reduce latency and memory usage. Other applications may render pencil incrementally and cache it.

Scaling: strokes may be rendered at different resolutions natively, as opposed to being rendered and then scaled. This may limit scaling artifacts. It may also cause strokes to render faster while zoomed out. Other techniques may render ink at a fixed resolution, and may exhibit some scaling artifacts.

Minimal latency: rendering natural ink such as pencil traditionally uses stamps. The described techniques may, in some embodiments, ensure that a stamp is always placed directly under the stylus tip, to avoid a perceived latency as the stylus is moved. Additionally, the spacing between stamps may be maximized to improve performance and decrease quantization. The use of circular stamps may make it more difficult to place stamps at a small number of pixels from one another. If ellipses are used which orient with the stylus angle, the percentage of overlap may be higher given the same spacing in pixels.

Supporting variable width strokes: the described techniques may expose different stroke widths, unlike applications that only allow strokes to be stretched or zoomed. Supporting larger strokes may aggravate the latency problem described above. The absence of tilt may make it more difficult to render thick strokes because the imprint of the stamp is typically circular without tilt. This is related to the issues with stylus angle described above. The combination of thick strokes and rendering without tilt may cause challenges with spacing and latency.

Blending: pencil content may blend directly over other content using source-over blending or blend modes similar to source-over blending. The described techniques address the latency problem with a new compatible type of blending.

Repeatability: applications may access the ink stroke curves already produced and manipulate them, such as erasing a section of a stroke and converting it into two strokes. The resulting strokes may render at least close to their original appearance. Other implementations may not allow another component to edit the strokes they produce and render, and may not support erasing section of a stroke themselves (instead, they may paint the background color over the canvas).

Existing techniques typically fail to provide adequate solutions in view of one or more of these constraints.

Two general types of ink are vector-based ink and natural ink. Vector-based ink typically does not support variable opacity throughout the stroke, and may not allow the color at a point to gradually build up as a stroke repeatedly touches it. Some embodiments may employ a pre-existing implementation for vector ink. Some embodiments may use Bezier curves to represent the shape of a stroke. Bezier curves are convenient for their smoothening algorithms and allow efficient representation of smoothened strokes. Unlike vector ink, natural ink typically builds up based on pressure and overlap. Rendering natural ink is often implemented by placing stamps at even distances along the path. Bezier curves, however, cannot be expressed as an algebraic function of distance. This means Bezier curves must be converted to a different form or approximated using a technique such as Gaussian Quadrature. In one embodiment, Bezier curves may be converted to (circular) arc segments and lines.

Two approaches to rendering ink in note-taking and sketching applications include the use of intentionally visible stamp instances and textured strokes.

Figure 2:
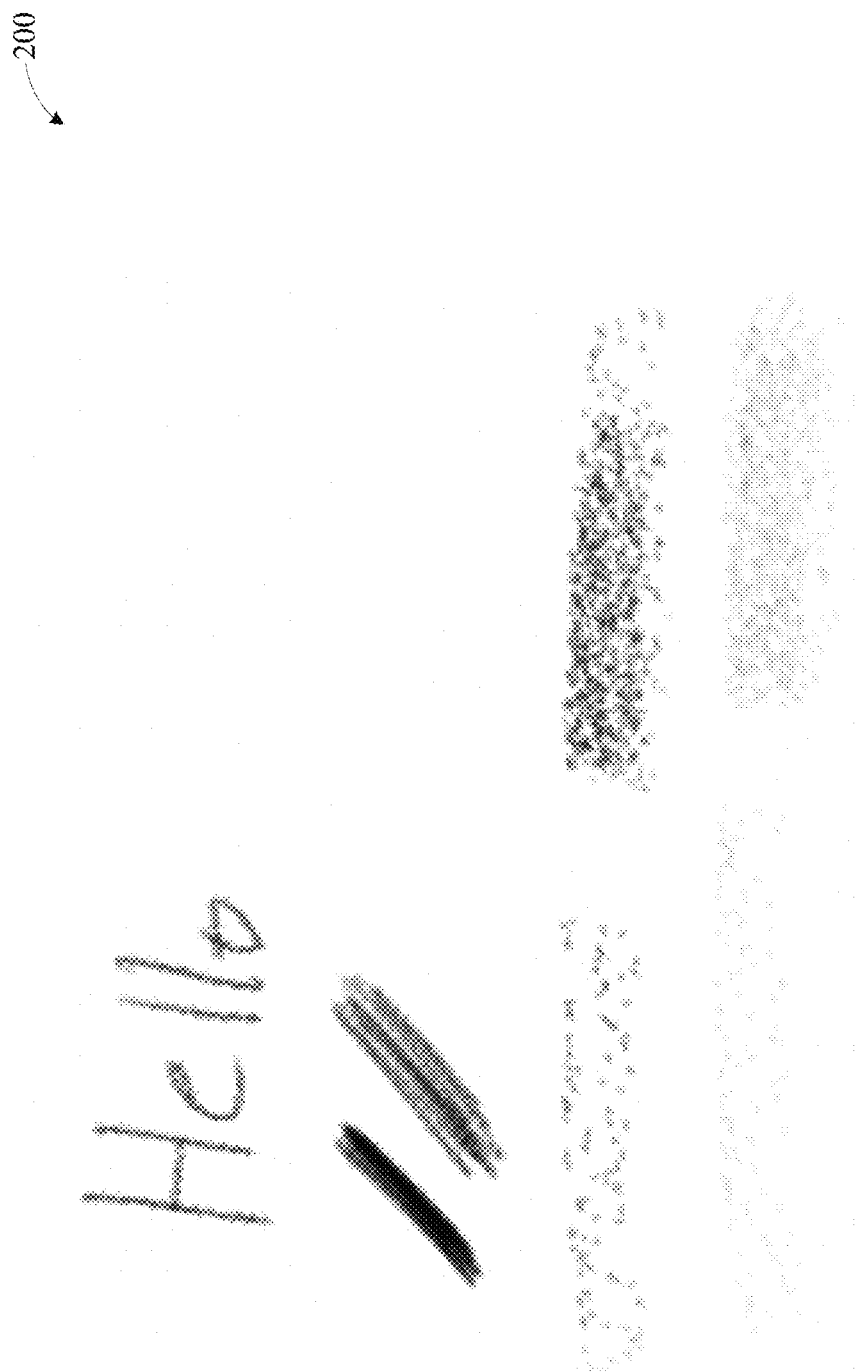
FIGS. 2-6 illustrate example strokes.

Intentionally visible stamp instances use individual stamps along a stroke which vary in an interesting way from one another. For example, the stamps may contain content that rotates or is otherwise different for each stamp. This variation is intentionally visible and causes the stroke to have a jagged look. The stamps for small ink may appear to be tiny lines or crisscrosses. Drawing with the pencil tilted may result in freckles that are placed at seemingly random offsets within an ellipse-like region surrounding the pencil. That region may be oriented according to pencil tilt. FIG. 2 illustrates example strokes rendered according to these techniques.

Such an approach using intentionally visible stamp instances may result in disadvantages. One disadvantage relates to stamp positioning: individual stamps are visible, so they always occur at the same positions. This means that the stamps cannot be re-arranged to guarantee that a stamp always falls under the pencil location. Another disadvantage relates to performance: rendering a large number of small specks requires significant overhead and may take longer to render (e.g., increasing perceived latency), and may look disjointed or not continuous. Another disadvantage relates to the appearance of thick strokes or shading: the look and feel where individual specks suddenly appear may not be desirable. This may be particularly true under dark pressure, and when scattering the specks within a large region surrounding the stylus. Another disadvantage relates to repeatability: a high amount of randomness within strokes may create a problem as applications erase and subdivide the strokes and expect them to appear similar afterward.

Figure 3:
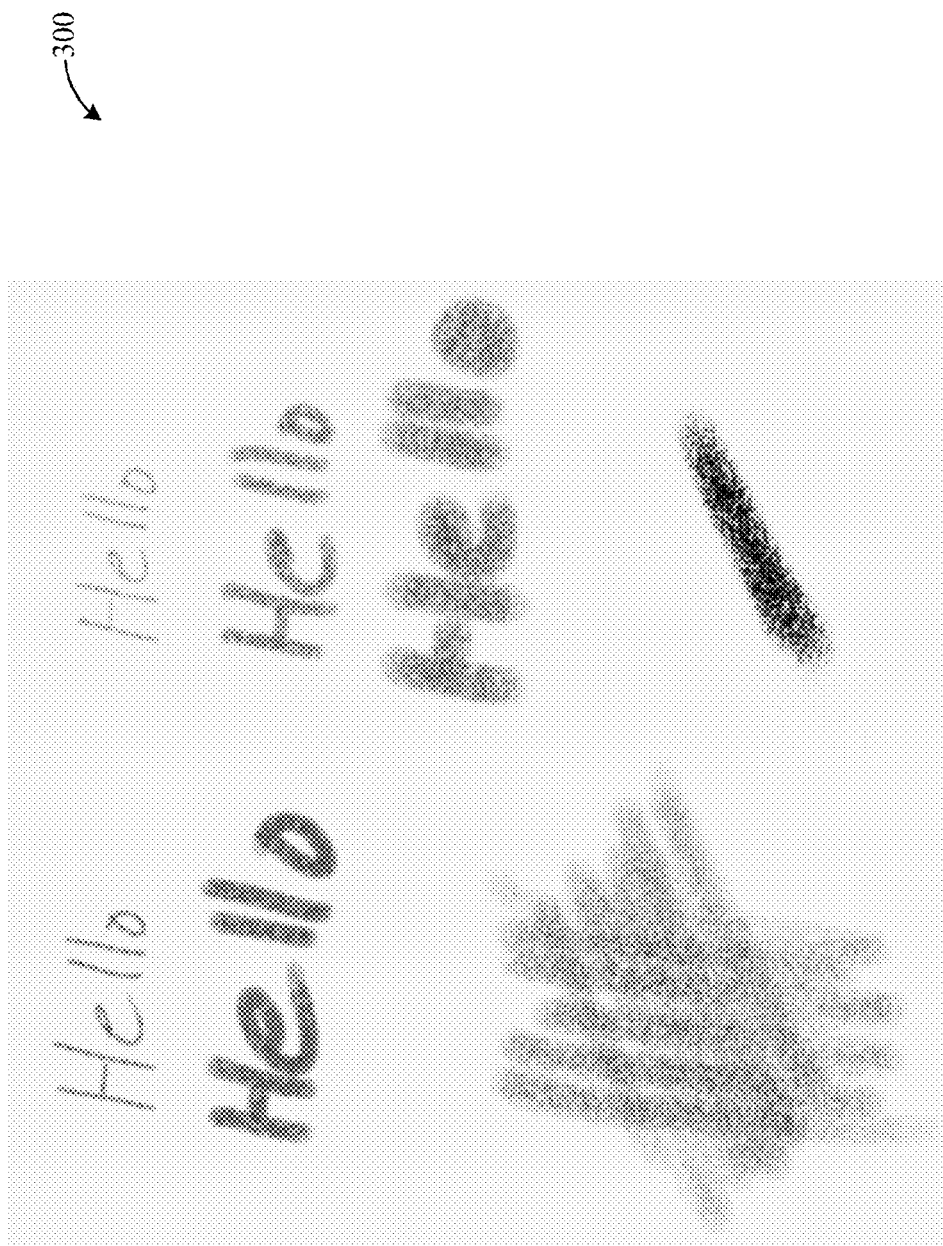

Another rendering approach includes the use of textured strokes. Rather than randomizing each stamp, some embodiments implementing extruded strokes may use a paper-like texture which is shared between multiple stamps. Each pixel in each stamp may interact in some way with the pixel of the paper texture at the same position. The stamps are effectively an approximation of an integral, which can be evaluated at any position. Changing the placement or density of stamps may not be noticeable to a viewer, as long as the weighting of the stamps is adjusted appropriately. An example of this technique would involve, for each pixel in each stamp, first evaluating a weight based on the distance from the center of that stamp. Then that weight may be multiplied by the paper texture at that point, combined with the pencil color, and blended to the target texture. Examples of strokes rendered using these approaches are illustrated in FIG. 3.

Using either of the above-described techniques, visible stamping or textured strokes, may result in no variation in the build-up. As a stroke repeats over the same position, the texture may become more and more apparent. For example, a crevice in the texture could remain with no coverage while pixels around it get darker and darker with more overlap, resulting in a sharp edge (see the bottom right of the FIG. 3). Additionally, regarding the interaction of colored strokes, it may be desirable to have one stroke fill in the gaps of another stroke to some extent, for example, to simulate shading, etc. Visible stamping or textured strokes, as described above, may result in the same pattern simply changing color instead, which may appear unnatural. Attempts to solve this problem by using a different pattern or offset into the pattern for each stroke may cause problems with ghosting, repeatability, and a sense that picking up the pencil temporarily may have the wrong effect on future drawing strokes. Another problem with this technique involves thin strokes, which empirically look better with higher frequency texturing, rather than using a single texture throughout. Another problem with this technique involves edges. Empirically, it is desirable to have strokes with a coarser and more varied edge than can be achieved using one texture.

In view of one or more of the problems described above, the techniques described below utilize one or more of curve processing, multiple textures, blending, and one or more pencil shading algorithms to yield more aesthetic variable opacity stroke rendering.

Curve Processing

Each stroke, which may be represented by a Bezier curve or segment, may be generated and rendered using a number of stamps to represent the path taken by a writing implement, for example. In order to place each stamp, the distance intervals along each stroke may be calculated. Computing distance along Bezier paths is computationally intensive, and may require some type of approximation. While some approximations such as Gaussian Quadrature could be used, the performance cost of repeating this process each time a stroke is drawn may be undesirable.

After an ink stroke is generated and smoothed as one or more Bezier curves, the ink stroke may be converted to a list of segments. Each segment has a beginning and ending point, and a pressure value may be associated with each of those points. The segments may be one of two types—straight lines, or circular or curved arcs. The pressure within a segment may be defined as varying linearly based on the pressure values associated with the beginning and ending points, and the distance of a point along the path of the segment. The conversion from a Bezier segment to multiple circular arc and line segments may be a one-time pre-processing step, such that these segments may be cached. The same arc segments may be used to render the stroke even as zoom-level changes. This allows the rendering code to perform fast operations in its inner loop. In some cases, one or more stamps of a stroke may be re-arranged by selecting a different density during zoom according to the thickness of the stroke as measured in screen pixels. This may include balancing stamp density vs. opacity based on different zoom levels. Incrementing from the position of one stamp position to the next within an arc is a simple matrix multiplication. Alternate implementations of natural ink rendering can also benefit from circular arcs. One such example includes using a shader to evaluate the coverage of a pixel within an arc mathematically, rather than using stamping.

The described arc segment representation may be constructed in a very specific manner to reduce errors produced by floating point imprecision. The representation may ensure that any slight error in the arc processing results in minimal visual error. When consuming simpler representation of an arc, it may be possible that the arc path snaps to a radically different path due to imprecision issues. This may be caused when the endpoint of an arc is placed incorrectly and the arc direction causes the delta theta, which is defined as the difference in angle from the arc's start to end, to snap to a much higher value. For example, instead of drawing very small arcs, whole circles may appear because the arc took the inverted path to the end point. To solve this issue, the rendering interface may consume both a direction and the size of the delta theta. Knowing if the delta theta is greater than 180 degrees may enable the reduction of the effect of snapping. The rendering interface may now consume an end point, a direction, radius, and whether the delta theta is greater than or less than 180 degrees. The information to be calculated to stamp an arc is the center point of the arc and the delta theta of the arc segment.

The center point of the arc may be calculated using the Pythagorean theorem. Using the size of the known sides of the triangle formed by the center point, the start point, and the end point, it is possible to calculate the center point of the arc exactly. This calculation can suffer from imprecision issues, but only in cases where resulting curves generated by the arcs are so small that the imprecision issues are not a concern for most usage scenarios. Some embodiments may ensure that if the CPU incorrectly calculates the direction of the arc, the smallest snapping error possible occurs. This may be an issue when the delta theta of the input arcs are extremely small which, when combined with the finite accuracy of floating point numbers, can cause arcs to be snapped by nearly 360 degrees.

To calculate the center point of an arc, first a triangle formed by the three points of the arc may be defined: the start point, the end point, and the center, where the center point is unknown. The length of the sides of this triangle can all be determined: the radius of the arc is the length of the sides formed by the center point and the two known points, start and end. The distance between the start point and the endpoint can be calculated directly and is the length of the last side. The height of this triangle can be calculated by using the Pythagorean Theorem:

heightOfTriangle=sqrt(arc.radius*arc.radius−(Distance/2)*(Distance/2))

The middle point between the start and end points may be calculated by:

middlePoint=startPoint+(distance/2)*direction

The center point of the arc can now be calculated by using one of the perpendicular vectors formed from the direction vector, the middle point, and the height of the triangle. However, there are two perpendicular directions possible from the single direction vector, so the correct direction must be chosen. To reduce the effect of possible errors, a center point which changes the delta theta from <180 to >180 may be discouraged or discarded as a possible solution. To choose the correct center point from the two possible perpendicular directions, we may use the user-supplied data.

If the input arc segment is defined as either clockwise and <180 degrees, or Counter Clockwise and >180 degrees, the following equation may be used:

Use (−y,x) perpendicular vector center.x=middlePoint.x+height*(direction.y*−1.0f;

center.y=middlePoint.y+height*direction.x

Otherwise, the following equation may be used:

Use (y,−x) perpendicular vector center.x=middlePoint.x+height*direction.y;

center.y=middlePoint.x+height*(direction.x*−1.0f;

Two methods may be used to calculate the delta theta of the input arc. One method is fast but may not be sufficiently accurate on some CPUs. This method is as follows:

DistanceSquared=mag(arc.endPoint−startPoint)^2 where:
a^2=b^2+c^2−2*b*c*cos(A)
a=straight line distance between start and end points
A=angle between start and end vectors from center
b=c=radius
distanceSquared=r^2+r^2−2*r^2*cos(A)
distanceSquared−2*r^2=−2*r^2*cos(A)    1.0f−distanceSquared/(2*r^2)=cos(A)
A=a cos(1.0f−distanceSquared/(2*r^2))
Mag (x,y)=sqrt(x^2+y^2)
deltaTheta=a    cos(1.0f−distanceSquared/(2*arcSegment.radius*arcSegment.radius));
Finally, if the arc is >180 then we need to go the long way around by negating deltaTheta. In most usage scenarios, delta theta calculations are required to be extremely accurate. Better results may be found by calculating the angle relative to the x-axis for both the start and end points and using the direction and relative magnitude (>180 or <180) to calculate the deltaTheta. This method may require significantly more CPU usage but does not rely on the accuracy of extremely small floating point numbers.

Multiple Textures

Natural ink strokes are inherently more costly to render than vector ink strokes because they require a property known as build-up. Build-up is the concept that the weight of a given pixel is not solely dependent on the distance from the stroke. It also implies that the weight contributed by a stroke is not an all-or-nothing behavior. This means that to evaluate the weight contributed by a stroke to a given pixel, one must evaluate the integral of the weight curve across the relevant nearby portions of the stroke for that pixel.

The weighting curve of the stroke is dependent on the (x, y) location of the output pixel which makes it impossible to evaluate the integral in a non-pixel-specific manner. This implies that to properly calculate the final contribution of a stroke, for each output pixel, the integral for each output pixel must be evaluated.

One method to evaluate the integral of the stroke contribution is known as "Stamping." Stamping is the industry standard for natural ink stroke rendering and works by approximating the integral using numerical estimation. The numerical estimation is achieved by rendering a large number of sample points along the stroke as "Stamps." This gives the illusion of a continuous weighting function across the stroke as long as the numerical estimation uses a high enough sample rate. The following equation represents the contribution of a natural ink stroke modeled by the integral of the weight curve and the numerical estimation used to calculate it.

$$f(x, y) = \int W(D, x, y)dD \approx \frac{1}{N}\sum_{k=1}^{N} W(D(k), x, y)$$

x=x coordinate of output pixel
y=y coordinate of output pixel
f(x,y)=Contribution of a stroke to pixel (x, y)
D=Distance along stroke
W(D, x, y)=Weight contributed by stroke at distance D for pixel (x, y).
N=Number of sample points(stamps)
D(k)=Distance as a linear function of sample point index.

Because of the problems described above with respect to the "intentionally visible stamp instances" solution, it is desirable to use overall texturing that is in some ways continuous between different stamps. But to avoid the problems of the "textured strokes" solution, a system may be implemented that uses multiple textures and varies one of those textures continuously. One of the multiple textures includes a "paper texture," which is created using an image that appears like paper. However, in other cases, the paper texture can be developed based on synthetic noise. Any time a pixel is covered by some stamp, the evaluation of that pixel may use the same pixel from the paper texture. In other words, this texture does not logically change as a stroke is laid down or as a stroke ends and a new stroke begins. A second texture may be used that does vary, referred to herein as "noise texture." This texture can be populated or created with Perlin noise, but can also be created using another type of synthetic or natural image as well. The noise texture may vary as pencil is laid down, unlike the paper texture. The variation depends on the amount of distance along the path of the stroke, from the beginning of that stroke to the location of the current stamp. By using two different textures, one varying and one constant, the following advantages may be enabled and realized:

enabling different strokes or parts of a stroke to fill in gaps of other strokes;
causing a smooth and smudgy feel with high overlap; and
enabling better results with coarser texturing with broader gaps (some gaps occur at different locations over time, and do not result in sharp edges when overlap occurs).

As long as the noise texture contains sufficiently low frequency data, the variation is slow enough, and the stamp spacing is small enough, the stamps can still be redistributed to ensure that one always exists under the stylus without a noticeable visual impact. With the right tuning of the textures and shading algorithm, the visual impact of this variation is not objectionable. Different types of variation of this texture are possible. In one aspect, the texture may be moved in a horizontal direction by an amount that increases with length along a stroke, with the translation set to zero as a new stroke begins. The type of Perlin noise function implemented may also be used to generate a three-dimensional texture, allowing sampling from two-dimensional depth slices. In this case, a depth translation may be used with or instead of the horizontal translation.

In one example, stamps may be constantly re-arranged as ink is laid down to ensure the last stamp is directly underneath the pencil despite the distance between stamps being 10-20% of the stamp diameter. This holds true for reasonably sized ink and zoom levels.

In some cases, the texture contributions of each stamp may be evaluated individually, to reduce the appearance of individual stamp instances being discernable. This may also enable positioning and re-positioning of stamps without hindrance, and may ensure that a stamp is always placed at the end of a stroke (e.g., by redistributing other stamps along the stroke), while reducing the perceived latency.

The upper limit on stamp spacing may be set by a combination of accuracy and stamp location snapping. Having large stamp spacing may decrease the accuracy of the integral which appears as individual stamp locations become visible and the illusion of a smooth stroke may be broken. Additionally, stamp positioning may suddenly change as stamps are arranged to ensure a stamp is located or placed at the end of a stroke (to reduce perceived latency). With large enough spacing, this snap may become visible.

The lower limit on stamp spacing may be set by a combination of rendering time and quantization. Lowering the stamp spacing may cause more stamps to be rendered which may be slower. If too many stamps are rendered, poor frames per second or glitching is likely. Quantization may also be possible with low stamp spacing because as more stamps are used each individual stamp contributes less, which can be problematic because each individual stamp is quantized depending on the accuracy of the render target. The upper and lower limits on stamp spacing may form a target spacing range.

In some aspects, variable stamp spacing may be employed. Variable stamp spacing is the concept that stamp locations can be altered slightly without causing visual artifacts. Variable stamp spacing is not a guaranteed feature when rendering arbitrary stamps. The described techniques, including stamp texturing and weighting, are designed to be as continuous as possible. Any discontinuities in the stroke contribution can become visible when stamp spacing is changed and may be avoided when texturing is used. Having the ability to change the stamp spacing solves some problems associated with stamping algorithms. One problem that it solves is latency of pen input. This may be achieved by guaranteeing a stamp at the very end of each stroke. Variable spacing also solves the problem of overdraw at different zoom levels. Having the ability to vary stamp spacing allows the user to pick the appropriate stamp spacing for the current zoom level. This both allows the user to reduce the number of stamps while zoomed out and increase the accuracy of the integration which zooming in.

Stamp locations may be generated at even intervals along the stroke by walking along each arc and line segment in turn generating the stamp data. The distance between each individual stamp is the same within a stroke, but it may be less than the requested stamp distance. To solve the problem of latency, stamp spacing may be adjusted in order to guarantee a stamp at the beginning and end of a stroke. The adjusted stamp spacing may be calculated by placing a stamp at the beginning and end of the stroke and then placing stamps between them with as close to the requested density as possible. This algorithm would break down if the stamps could not vary in spacing because visible texturing artifacts would be present as the stroke grows. Each individual segment is rarely mapped to an exact integer number of stamp locations. This means that offsets between each segment must be tracked and appropriately accounted for in each segment. Arc stamping may be more complicated than line stamping because arc directions can be more complex. For arc segments, each stamp location can then be found sequentially by rotating the start point about the center of the arc segment.

In one example, offsets for stamp placement along a linear or line segment may be determined. Each stamp may then be placed by moving along a line by the determined offset. The offset into a new line may be determined by calculating the distance off the end of the line of the next stamp. Offsets for stamp placement along an arc segment may be determined. The offset and stamp distance may then be converted into rotation amounts. The stamp may be placed by moving along a line by the determined offset. The offset into the next segment may be determined by calculating the distance off the end of the arc.

Blending

Pencil strokes may be blended over themselves and over other content using a blend mode similar to source-over. A technique may be used to enable simultaneous adjustment of stamp density and weighting, to achieve a consistent appearance even while blending over other content. The technique includes logically treating the weight of a pixel within a stamp as a number of times that a color with fixed opacity is blended within that single stamp. In some cases, the count of blends can be fractional. This equates to using source-over blending on the GPU, but first evaluating the following equation. This equation converts the amount of deposition of a pixel within a stamp (n) to the pre-blended output, using a coefficient M. The value n below is scaled by this point to reflect the fractional overlap between each stamp:

$$\text{ShaderOutput}RGB = \text{PencilColor\_Unpremultiplied} * (1 - M^n)$$

$$\text{ShaderOutputAlpha} = (1 - M^n)$$

$$\text{NewDest}RGB\_\text{Premultiplied} = \text{ShaderOutput}RGB + (1 - \text{ShaderOutputAlpha}) * \text{OldDest}RGB\_\text{Premultiplied}$$

$$\text{NewDestAlpha} = \text{ShaderOutputAlpha} + (1 - \text{ShaderOutputAlpha}) * \text{OldDestAlpha}$$

Source-over blending is defined as follows:

$$\text{NewDestRGB}_{Premultiplied} = \text{SourceRGB}_{Premultiplied} + (1 - \text{SourceAlpha}) * \text{OldDestRGB}_{Premultiplied}$$

$$\text{NewDestAlpha} = \text{SourceAlpha} + (1 - \text{SourceAlpha}) * \text{OldDestAlpha}$$

This can be re-arranged and expressed in terms of unpremultiplied source alpha as follows:

$$\text{Source}RGB_{Unpremultiplied} - \text{NewDest}RGB_{Premultiplied} = (1 - \text{SourceAlpha}) * (\text{Source}RGB_{Unpremultiplied} - \text{OldDest}RGB_{Premultiplied})$$

1−NewDestAlpha=(1−SourceAlpha)*(1−OldDestAlpha)

Replacing (1−SourceAlpha) with M, and applying the operation N times over the previous result, produces the following:

$$\text{Source}RGB_{Unpremultiplied} - \text{NewDest}RGB_{Premultiplied} = \\ (\text{Source}RGB_{unpremultiplied} - \text{OldDest}RGB_{Premultiplied})*M^n$$

$$1 - \text{NewDestAlpha} = (1 - \text{OldDestAlpha})*M^n$$

This expands to:

$$\text{NewDest}RGB_{Premultiplied} = \text{Source}RGB_{Unpremultiplied}* \\ (1-M^n) + \text{OldDest}RGB_{Premultiplied}*M^n$$

$$\text{NewDestAlpha} = (1-M^n) + \text{OldDestAlpha}*M^n$$

This can fortunately be implemented with source-over blending:

$$\text{ShaderOutputRGB} = \text{Source}RGB_{Unpremultiplied}*(1-M^n)$$

$$\text{ShaderOutputAlpha} = (1-M^n)$$

The following equation may control the manner in which strokes blend with what is behind them. Blending may occur with a special type of source-over blending. Pencil ink may be blended by treating coverage as a count of times which a color with constant opacity is blended (where the count may be fractional). This allows the coverage to be adjusted simultaneously with stamp density, and for different overlapping regions of a stroke to be re-arranged or accumulated with addition, prior to blending. An example equation for determining blending is provided below:

$$\text{TargetColor} = \text{SourceOver}(\text{TargetColor}, \text{float4}(\text{Color} \\ .RGB, 1)*(1-(1-\text{blendOpacity})^{\wedge} \\ (\text{weightToBlendCount}*\text{coverage})))$$

An ink stroke's appearance (e.g., for rendering) may be defined by the radius of the stroke, the color of the stroke (may exclude alpha color information), the seed value for translating the noise texture, and/or the amount of translation applied to the first of two paper textures (either noise or paper texture), per stroke distance. In some cases, other options may be configurable for building and blending strokes with other content, such as content that is beneath a stroke.

Each stroke may then be drawn, based on the start point of the stroke (e.g., a touch location of a stylus, finger, or other writing implement), one or more styles associated with the implement used or selected to create the stroke (e.g., pencil, charcoal, chalk, etc.), paper and noise texture information, and stamp density, which may be represented by a percentage.

The drawing application may print or serialize to a format that does not natively support pencil by generating the sequence of stamps as described herein. Each stroke may be turned into an image (with multiple stamps per stroke), and each stroke image may be serialized individually.

Storage for ink segments may work on a stack-based system for efficient caching of arc and line segment calculations. As segments are added to the ink stroke, the segment calculations that are more expensive will be stored in an expanded cache structure. This may facilitate a reduction in the cost of calculating the stamp locations, which may have a high CPU cost.

A simple form of culling may be implemented for pencil rendering. Bounding rectangles may be used to determine if strokes should be rendered using a hit or miss scheme. First, a bounding rectangle for the entire stroke may be used to see if the stroke intersects the render target bounds. If the stroke-bounding rectangle intersects the render target bounds, another pass may be performed to test bounding rectangles for each segment. If any rectangle in the stroke intersects the render target bounds then the whole stroke may be rendered.

Pencil Shading

An algorithm for shading the pencil strokes in a visually desirable manner in this system may be developed empirically. In an embodiment, the algorithm may use two textures as described above, and may execute for each pixel in each stamp. The result of the algorithm may be blended over the previous contents in the target texture. The algorithm may vary weighting and numerical offsets of the colors from the textures based on pressure and distance of a pixel from the center of the current stamp being rendered. The nature of this variation may be different between the two textures, and may also change based on the thickness of the stroke. More proportional weight may be given to the paper texture toward the inside of a stroke, and under heavy pressure. A more detailed example of pencil shading will be described below in reference to FIG. 8.

Figure 4:
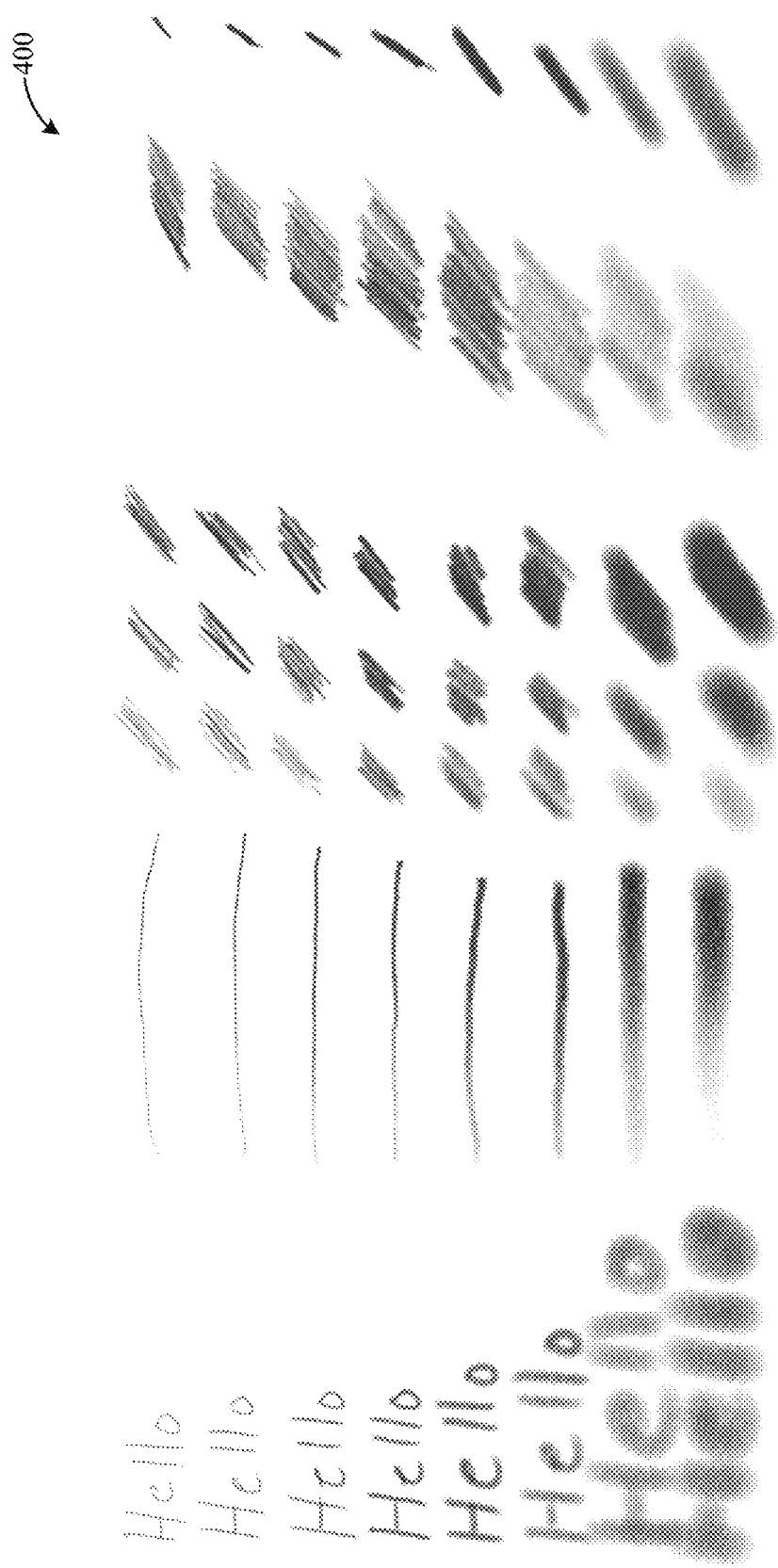

FIG. 4 illustrates images generated with the described techniques showing writing shading, and (far right), repeated overlap.

Figure 5:
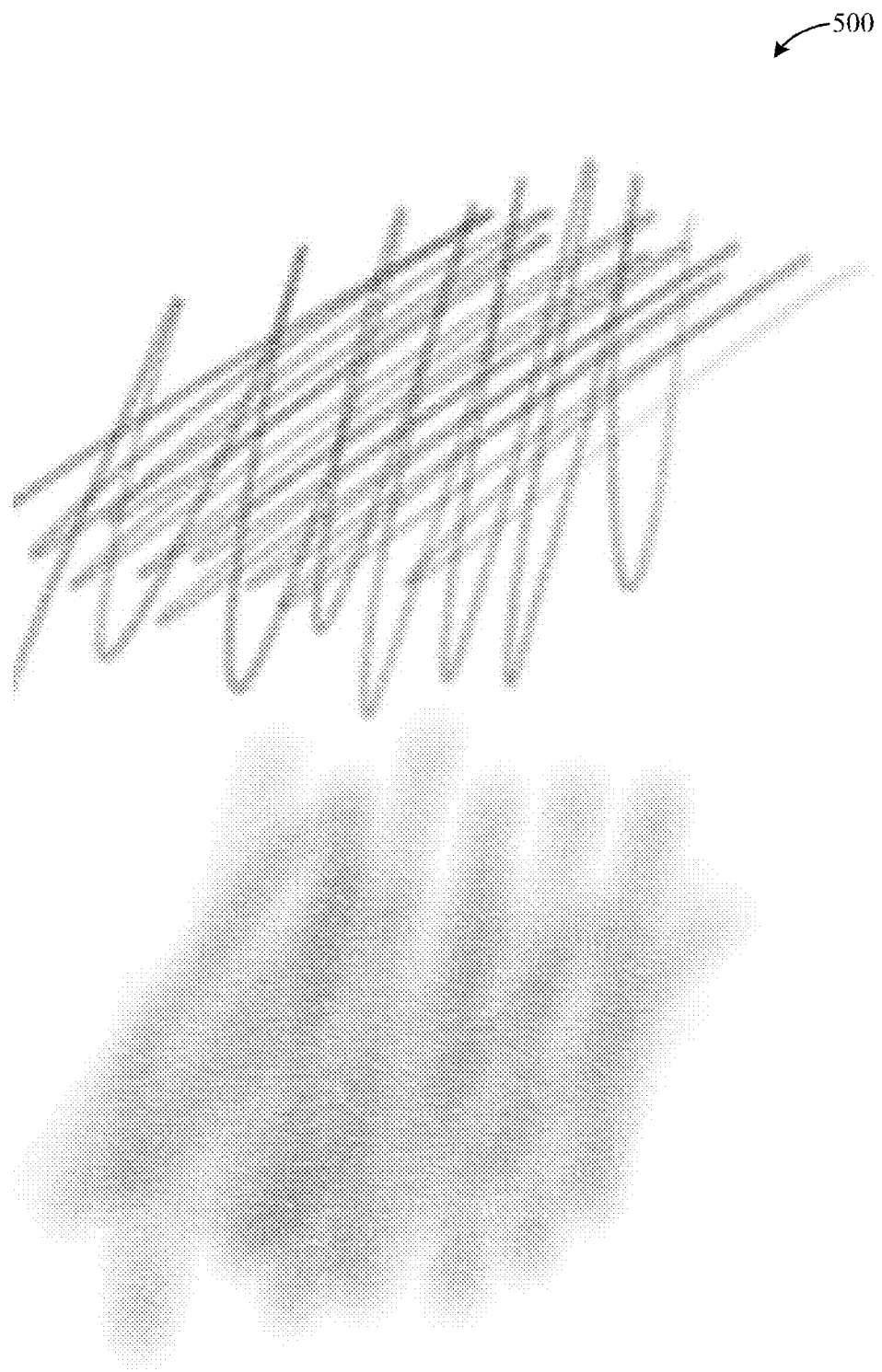

FIG. 5 illustrates examples of how strokes of different colors overlap.

Figure 6:

FIG. 6 illustrates the benefit of the variation that happens in the noise texture as a stroke progresses. The images of FIG. 6 show the same stroke resulting from moving the pencil repeatedly back and forth. The first image may be generated with the noise variation disabled, and the second with the noise variation enabled.

Figure 7:
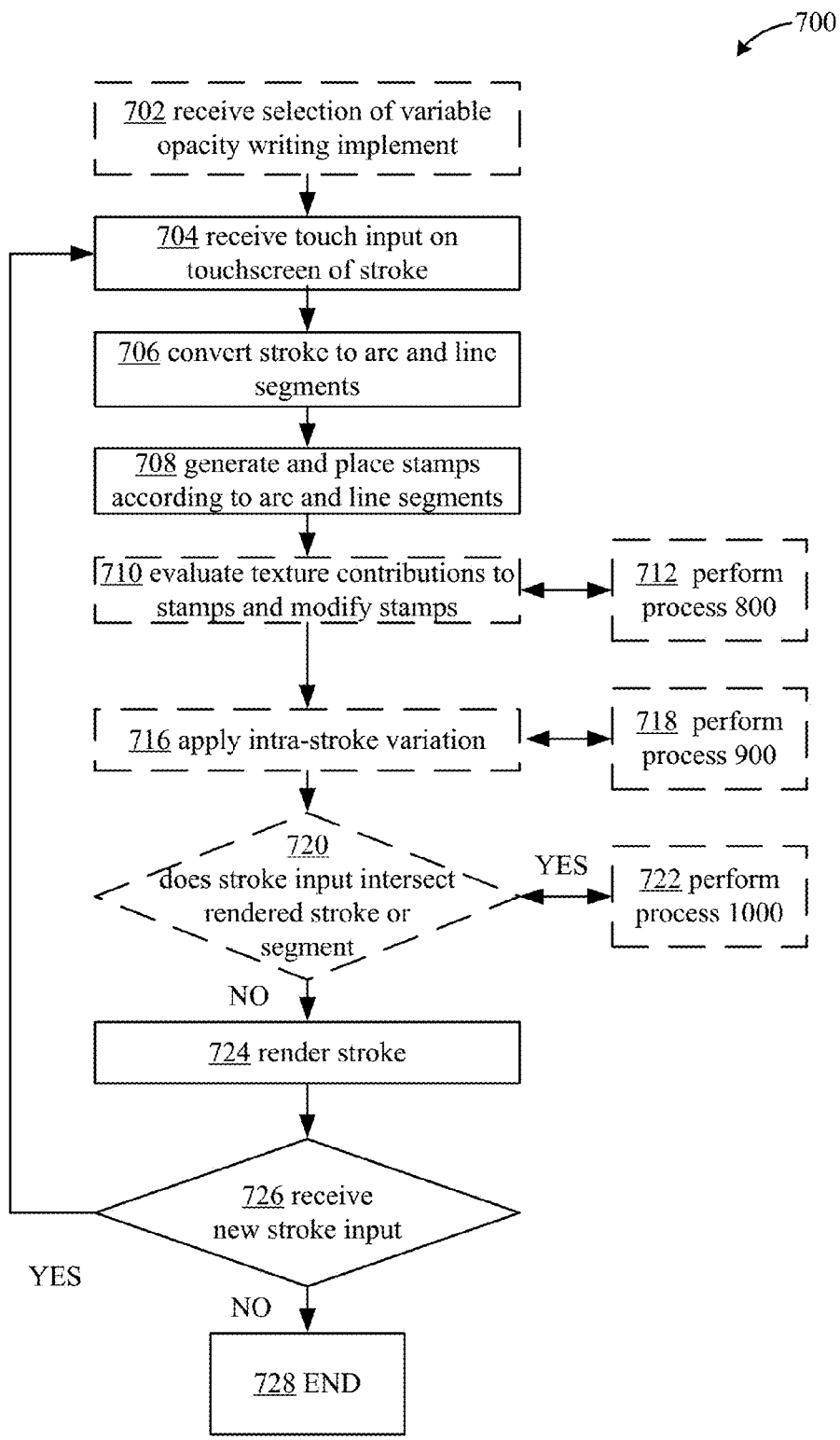
FIG. 7 illustrates an example process for rendering variable opacity strokes, in accordance with the described techniques.

FIG. 7 illustrates an example process 700 for rendering variable opacity strokes, for example, that may be implemented in conjunction with a touchscreen-enabled device. As used herein, dashed lines of a box or operation in any figure indicate that the operation is optional, such that it may be excluded. Process 700 may begin at operation 702, where a selection of a variable opacity stroke, such as pencil, chalk, crayon, or other writing implement, may be received. Operation 702 may include receiving a selection via a user interface associated with any of a variety of writing, notetaking, or drawing applications. At operation 704, touch input corresponding to a stroke may be received. At operation 706, the touch input may be converted to arc and line segments, for example, as described above. At operation 708, stamps may be generated and placed along the arc and line segments. In some aspects, texture contributions, for example, paper and noise texture contributions, may be evaluated for one or more stamps and used to modify the one or more stamps. In some examples, operation 710 may include performing process 800 at operation 712, as described below.

Additionally or alternatively, intra-stroke variation may be applied to the current stroke, at operation 716. Operation 716 may include performing process 900 at operation 718, as will be described in greater detail below.

In some aspects, process 700 may include operation 720, in which it may be determined if the stroke input intersects or overlaps with an already rendered stroke or segment. If the new stroke does overlap, process 700 may proceed to operation 722, in which process 1000 for blending strokes may be applied to the intersection region of the stroke. In some aspects, operations 702/process 1000 may be performed consistently or periodically throughout process 700 or the receiving of input and rendering of strokes. Upon the completion of operation 722, the stroke may then be rendered at operation 724. It may be determined if another stroke input is received at operation 726, and if so, process 700 may loop back to operation 704 and continue to loop through operations 704-724 until no more stroke input is received, at which point process 700 may end, at 728.

It should be appreciated that various operations of process 700 may be omitted, such as one or more of operations 702, 710, 712, 714, 716, 718, 720 and/or 722.

In one example, the described rendering techniques may be exposed as an API, such as an internal API, to one or more digital ink or input applications.

In one example, the path of a stroke may be represented by the size and direction of the arc, such as small (less than 180 degrees), large (greater than or equal to 180 degrees), clockwise or counterclockwise, and/or as a line segment. Each point within each stroke may be represented by x, y coordinates (e.g., relative to a coordinate system corresponding to the input device), and a pressure value. A segment may be represented by a point, such as an endpoint, including x, y, coordinates and a pressure value, an arc radius, and a path type (either arc with size and direction, or line segment).

Figure 8:
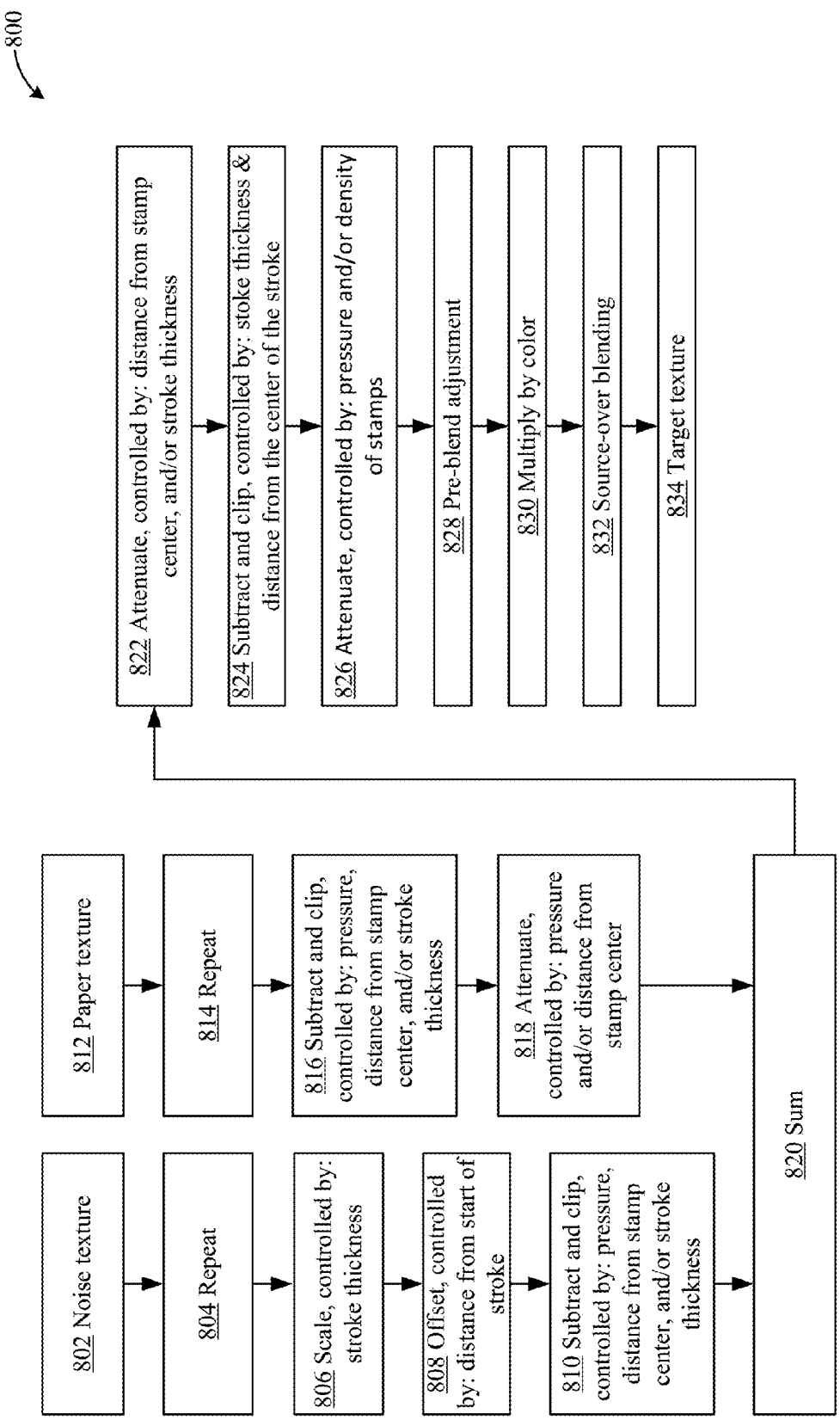
FIG. 8 illustrates an example process for performing variable opacity redesign using at least two textures, which may be used in combination with process 700.

FIG. 8 illustrates an example process 800 for combining texture information with stamps for rendering variable opacity strokes, e.g., rending pencil shading. Process 800 may be performed, in some cases, at operation 712 of process 700, described above. In other cases, process 800 may be performed separate or independently from process 700. In some aspects, a pixel shader, such as part of a graphics pipeline, which may be implemented by a GPU or as part of a CPU, may perform process 800.

Process 800 utilizes two textures as described above, and may be performed for each pixel in each stamp. The result of the process 800 may be blended over the previous contents in the target texture. Process 800 varies weighting and numerical offsets of the colors from the textures based on pressure and distance of a pixel from the center of the current stamp being rendered. This nature of variation is different between the two textures, and also changes based on the thickness of the stroke. More proportional weight may be given to the paper texture toward the inside of a stroke, and under heavy pressure.

In one example, a pixel shader, for example of a graphics pipeline implemented by a GPU, may calculate the fractional distance from the current pixel to the center of the current stamp. Next a weight or coverage may be determined and associated with each pixel, for example, according to the following equation:

float weight=
(fractionalDistanceFromStampCenter<flatWeightRegion)1.0:
smoothstep(0,1,1−(fractionalDistanceFrom-
StampCenter−flatWeightRegion)/(1−flatWeight-
Region));

In some cases, the noise and paper texture may be combined such that more noise may be used toward the outside edges, and under light pressure, to cause more coarseness and prevent the same edges from becoming visible during overlap. In some aspects, the weight associated with each pixel may be determined based on the following equation:

Weight=lerp((*tex.g+tex.r*),*tex.r*,*pow*(proportionToCenter,lerp(0.3,1,saturate(brushWeight))));

In some cases, the noise and paper texture may be combined such that more noise may be used toward the outside edges, and under light pressure, to cause more coarseness and prevent the same edges from becoming visible during overlap. Another implementation, designed to reduce halos, may use the following equation:

*tex.rg*=max(0,*tex.rg*−0.35*max(0,(1−brushWeight))
*proportionToCenter);

weight*=(*tex.r*+lerp(0.5**tex.g*,2**tex.g*,(1−proportionToCenter)*brushWeight));

Process 800 may use the distance information and the weight associated with each pixel to then combine two textures with the stroke input to define the stroke via a number of variable opacity pixels. Process 800 may begin with sampling the two textures, a varying noise texture 802, and a paper texture 812, at coordinates of each pixel, for example, that may be provided directly from the vertex shader, at operations 804, 806, 808, 810, and 814, 816 and 818, respectively. From a high level, the value of each pixel may be determined based on the sampled texture values at the location of each pixel, pressure associated with the pixel (e.g., from the stroke input), and the weight associated with each pixel, per one or the equations above.

In a specific example, the textures 802 and 812 may be combined via scaling, offsetting, and subtracting of clipping. Each texture 802 and 812 may be repeated, for example, at operations 804 and 814. Operations 804 and 814 may include repeating or propagating each texture in a grid, horizontally and vertically. For example, if the texture is 100 pixels wide and the next pixel is located at X=101, the next pixel becomes X=1.

The noise texture 802 may be scaled, for example, based on thickness of the stroke input, at operation 806. This may result in thin strokes looking better/more aesthetically pleasing when viewed close up. The noise texture may also be offset, for example, controlled by a distance of a current location from the start of the stroke, at operations 808. Next, each texture 802 and 816, may undergo a subtract and clip operation 810 and 816, which may be controlled by an input pressure, a distance of the current location from the center of the stamp, and/or the stroke thickness. In one example, operations 810 and 816 may include subtracting an amount from the sampled texture values that varies with pressure and distance from center of the stamp. The paper texture 812 may then be attenuated, for example, based on pressure and/or the distance of the current location from the stamp center, at operation 818. The two texture contributions may then be summed, at operation 820. In some cases, more weight may be given to the paper texture 812 when pressure is high and toward the inside (e.g., center) of the stamp. The operations for each of noise texture 802 and 812 may be performed independently and/or concurrently.

After the texture contributions have been added together at operation 820, the pixel weight may be added to the result of operation 820, and the combination may then be attenuated, for example based on the distance from the stamp center and/or the stroke thickness, at operation 822. The combined value may then be clipped, at operation 824, for example, based on stroke thickness and/or the distance from the center of the stroke. In some cases, operation 824 may include subtracting an additional value from the pixel which varies based on pressure and is gradually increased beginning at a minimum distance from the center of the stamp. The combined value may then be attenuated, for example, controlled by pressure and/or density of the stamps (e.g., proximate stamps), at operation 826.

The resulting pixel value may be adjusted according to the opacity value, which has been adjusted by this point based on stamp spacing, and or a pre-blend adjustment applied, as described above, at operation 828.

In some aspects, the pixel shader may use a constant buffer containing color, and blending parameters, such as color, blend alpha, and coverage to blend count, to multiply the pixel value by color, at operation 830. In some aspects, source-over blending, as described above, may be applied to the pixel value, at operation 832. In other cases, source-over blending may be applied before application of texture, or not at all. The result of process 80 may output a target texture or pixel value at operation 834.

Each of the undefined constants below may be either a constant value, or may vary linearly based on the thickness of the stroke.

In some aspects, an amount varying according to pressure and distance from the center of the stamp may be subtracted from the pixel value. This may result in the edges of the stroke appearing coarser, and may make light-weight strokes also appear generally coarser.

Figure 9A:
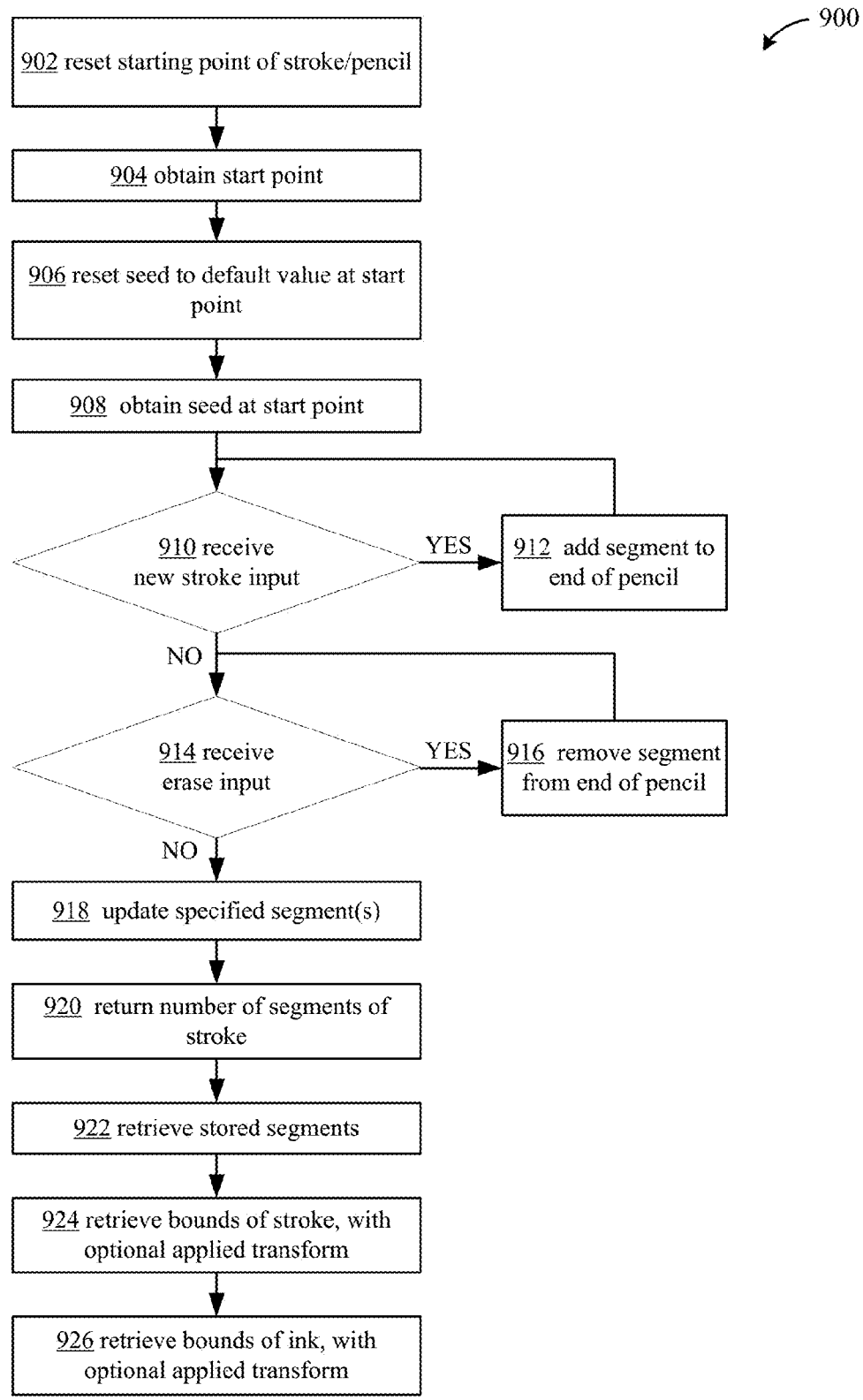
FIGS. 9A, 9B, and 9C illustrate an example process for performing intra-stroke variation or shading, which may be used in combination with process 700.

In one example, the noise and paper textures may be combined based on pressure and distance within the stroke, such as according to the following equation:

A stroke, which may be a single input and continuous, may then be defined by a series of segments or arc segments. FIG. 9A illustrates an example process 900 for building and erasing a stroke segment by segment. Intra-stroke variation, which may comprise the build-up technique described above, may be controlled by a seed value that changes along the stroke's distance. Intra-stroke variation can be applied stamp by stamp. The seed value/intra-stroke variation may be useful for maintaining the look of the pencil etc., as one stroke turns into multiple strokes. Applying intra-stroke variation may be incorporated into the process for adding and erasing segments, as will be described in greater detail below.

In some aspects, process 900 may start at operation 902, where the starting point of a stroke/writing implement may be reset. At operation 904, the starting point of a stroke may be obtained, for example via receiving one or more touch inputs of a touch-screen enabled device. At operation 906, the seed value associated with the stroke may be set/reset to a default value. The seed value associated with the starting point may be obtained/modified from the default value at operation 908. Process 900 may further include adding new segments, for example, to the end or point of the written implement as new stroke input is received, at operations 910 and 912. If an erase input is received, process 900 may include removing a segment from the location associated with the writing implement, at operations 914 and 916. At operation 918, one or more segments may be updated based on the seed value. In some aspects, the seed value may change according to changes in pressure of the received input, distance along a segment of the stroke, or based on other factors. At operation 920, the number of segments of the stroke may be determined/returned. At operation 924, the bounds of the stroke may be retrieved, and in some aspects, modified based on an applied transform to smooth the stroke, for example, based on the received erase input. The applied transform may include a numerical matrix multiplied onto the XY positions of each pixel to accomplish scaling, rotation, etc. In some aspects, process 900 may also include operation 926, in which the bounds of the rendered ink may be retrieved, for example with an optional applied transform.

Figure 9B:
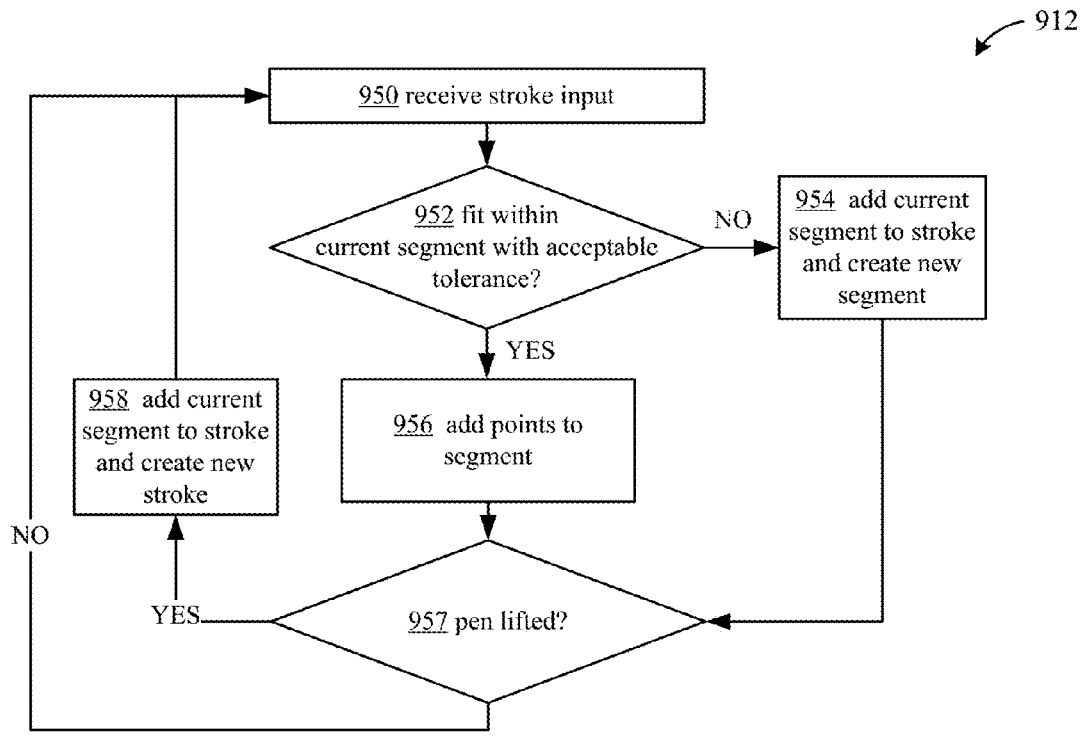

FIG. 9B illustrates a more detailed example of operation 912, for adding a segment. Operation 912 may include operation 950, in which stroke input may be received. It may be determined if the new stroke input can fit within the current segment, for example, within an acceptable tolerance, at operation 952. If the new stroke input can fit within the current segment, one or a number of points may be added to the segment, at operation 956. In some aspects, operation 956 may include adjusting the equation defining the segment so that it defines a new point along with the existing points in the segment. The length of each segment may be controlled by comparing a number of points associated with the segment to a maximum number of points allowable for a segment. If, at operation 952, the new stroke input will not fit within the current segment, the current segment may be added to the stroke (e.g., rendered without the new stroke input), and a new segment may be created, at operation 954. In either event (e.g., the performance of operation 956 or 954), operation 912 may further include operation 957, where it may be determined if the pen or writing implement has been lifted, via techniques known in the art. If the pen has not been lifted, operation 912 may start again at operation 950, and continue to loop through operations 952, 954, and/or 956, until no new input is received, or until the pen has been lifted, as determined at operation 957. If the pen has been lifted, operation 912 may continue to operation 958, where the current segment may be added to the stroke (e.g., rendered), and a new stroke may be created. Operation 912 may then loop back through to operation 950, and continue through operations 952, 954, and/or 956, until no new stroke input is received.

Figure 9C:
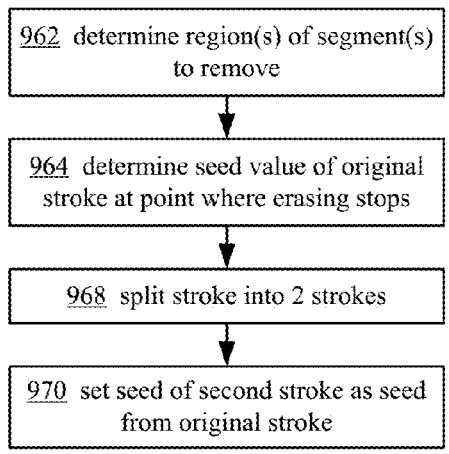

In some aspects, the seed value can also be used as a stroke is partially erased, for example, according to a more detailed example of operation 916, as illustrated in FIG. 9C. Operation 916 may further include operation 962, in which the region or regions of one or more segments to be removed may be determined. Operation 962 may include determining where touch input crosses or intersects an existing stroke or stroke segment. Next, at operation 964, the seed value of the original stroke (e.g., stroke or segment being erased) corresponding to the location of where the erasing action stops may be determined. The stroke or segment being erased may then be split into two separate strokes or segments, at operation 968. Next, at operation 970, the seed value of the second stroke may be set as the seed from the original stroke, corresponding to the location where the erasing action stopped.

Figure 10:
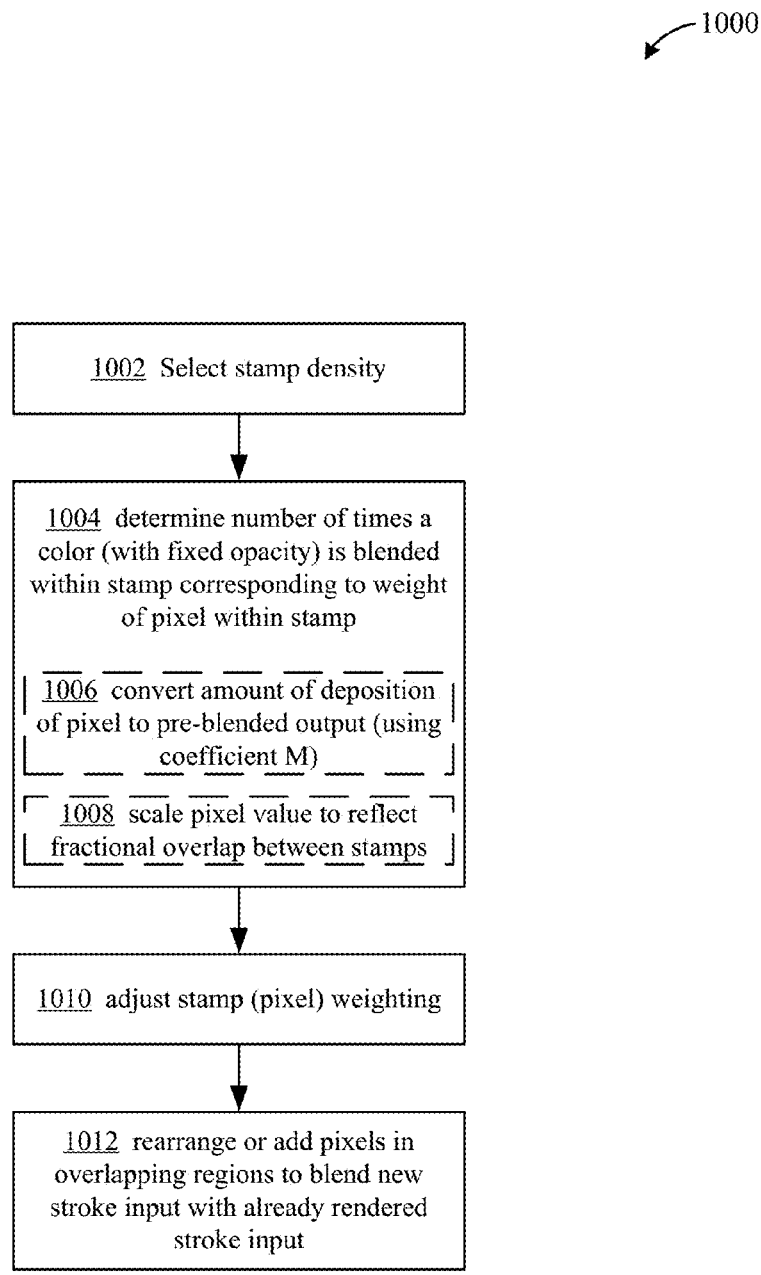
FIG. 10 illustrates an example process for blending variable opacity strokes, which may be used in combination with process 700.

FIG. 10 illustrates an example process 1000 for blending new stroke input with an already rendered or existing stroke or other visual data, which may include a part of the current stroke, texture contributions, or other data. In some aspects, process 100 may be a type of modified source-over blending. Process 10000 may begin with operation 1002, in which a stamp density may be selected. At operation 1004, the number of times a color, such as with fixed opacity, is blended within a stamp may be determined that corresponds to the weight of a pixel within a stamp, for example, based on the stamp density. In some cases, operation 1004 may further include operation 1006 and 1008. Operation 1006 may include converting the amount of deposition of a pixel to a pre-blended output, such using coefficient M, as described above. Operation 1008 may include scaling each pixel value to reflect a fractional overlap between stamps.

The stamp weighting or individual weighting for pixels within a stamp may also be adjusted, at operation 1010. Pixels in the overlapping region between the already rendered stroke and the new stroke input may be rearranged to blend the combination, at operation 1012. In some cases, operation 1012 may also include adding pixels in the overlapping regions.

Rendering

Stamps may be rendered to the final render target directly. The stamps may be batched together across stroke boundaries to reduce the number of draw calls so that the main use case of many smaller strokes can be well optimized. All stamp locations may be loaded as rectangles with per-stamp data into a vertex buffer and a vertex constant buffer, or other similar buffer associated with a GPU or CPU, may be used to store transform data which may be used across all strokes being batched together.

The vertex constant buffer may be used to store all stroke width information which may be needed to properly format the stroke. The constant buffer may store a world transform matrix which may be used to transform the position data stored in the vertex buffer to the appropriate output position for rasterization. This matrix may support any transform that needs to be performed without having to transform the vertex data on the CPU or GPU. The vertex constant buffer may also store the needed texture transforms so that the pencil textures can be transformed independently of the stroke. Finally, the vertex constant buffer may also store the needed stroke color information so that any color pencil can be supported.

The vertex buffer may be used to store the stamp locations to be rendered. Each stamp location may be loaded into the vertex buffer as six vertices containing all the per-stamp data needed to render that specific stamp. This data may include an X-Y position in untransformed screen space coordinates, a canonical position used to calculate distance from the center of the current stamp, two opacity floats (e.g., floating point numbers) containing the opacity modifiers for pressure and stamp density, and a single float for a seed offset to modify the pencil texture. Each vertex may be transformed in the vertex shader to the desired position, to avoid having to perform 2D affine transforms per-vertex on the CPU or GPU.

The vertex shader for the new natural inking algorithm may be relatively simple. The vertex shader may take input vertex data as described above, and transform the position data via the constant buffer transforms. Using the transformed position data, the shader may calculate the texture coordinates for the two pencil textures. This allows the ink stroke geometry to be in world space which simplifies the CPU or GPU calculations that need to be performed to offset each stamp.

The CPU code to populate vertex buffers can potentially be Single Instruction/Multiple Data (SIMD) optimized, such as in conjunction with indexing that changes the format and number of vertices.

In some aspects, the main CPU cost of the described techniques may be the stamp location generation. The described techniques calculate stamp locations by sequentially generating stamp locations one at a time and uploading all of that data to the GPU to be rendered. In one aspect, compute shaders may be used to generate stamp locations and render them directly. Such an implementation may include the CPU calculating the offsets of each arc and line segment. This should be a low amount of work for the CPU. Next, the CPU may upload arc and line segment data to the GPU including the calculated offsets. The CPU may calculate the adjusted stamp density and pass that data to the compute shader as a parameter. The CPU may upload vertex buffer data needed to render ink strokes as normal. The GPU may parallelize the stamp location calculations with an approximate threading model. In one example, the threading model may include 1 thread block per arc, and 16-32 threads per block used to calculate stamp locations. The CPU may draw the compute shader output as an Instanced Buffer.

Potential CPU cost associated with the culling algorithm may not scale efficiently to the generic case. One possible optimization is to implement a bounding volume hierarchy which would store and sort arc and line segments in a structure which could be efficiently queried for segments to render. This technique may reduce rectangle hit tests, and may be implemented if the hit tests are expensive and culling proves to be important.

In some aspects one or more of the following considerations may be taken into account to further optimize the rendering and drawing process.

Stamp spacing: the spacing of the stamps may impact the effectiveness of the algorithm. Spacing controls the tradeoff of accuracy of the result and speed of the algorithm. A smaller stamp spacing may cause more stamps to be used, which in turn takes longer to render as more stamps need to be rendered. There are upper and lower limits on the effective spacing. These limits may not be an issue with normal size ink and zoom factors, but may be an issue for certain animations. A spacing of 5-15% of the stamp diameter may be typically appropriate.

Unusually large zoom and ink sizes: when drawing ink that is larger or more deeply zoomed in on than typical scenarios, the described stamping approach can produce undesirable performance and artifacts such as quantization. In an embodiment, the pencil strokes may be rendered to an intermediate that is of smaller size and/or using a high precision pixel format.

Seeding of paper texture translation: the described technique involves gradually varying the appearance of a stroke as the stroke progresses. If a stroke is partially erased and subdivided, remaining parts may flicker. To avoid this effect, the paper translation seed may be set by the application according to distances along the affected regions of the stroke.

Generating paper textures: not all paper textures may interact well with the described pencil rendering approach. The paper translation amount and stamp spacing may need to be adjusted according to frequency content of the paper texture. In some examples, the noise may be regenerated according to zoom factor. A large bilinear down-scale may introduce high frequency components.

Overall opacity may require an intermediate layer: if an opacity is applied logically to the output of the pencil stroke, an intermediate layer may be needed for accurate results. There is a large amount of overlap between ink stamp instances, which makes it possible that applying a global weight does not actually reduce the maximum opacity produced by the ink.

In some cases, thin strokes (e.g., less than $1/\sqrt{2}$ pixel in diameter on screen) may be handled specially to prevent strokes from disappearing when zooming out. Any thinner strokes may be rendered with a diameter of $1/\sqrt{2}$, but with coverage reduced by the appropriate proportion. When a non-angle-preserving transform is used, strokes may still disappear on screen.

Point handling: special handling of points may not be necessary using the stylus, but may be necessary for mouse input. A single point can be rendered by creating a stroke with no segments. However, a discontinuous behavior between a pencil point and a small line or arc may exist. The opacity within a pencil line is actually a scalar that is logically multiplied by the distance travelling over a pixel to determine coverage. Because points have zero distance, the handling of point weight is special. To tune the opacity of a point, an ink style may be created and a weight determined to be used for blending. For example, DirectInk exposes "drawing attributes" which for pencil will include opacity. This opacity can be adjusted to cause single points to render with a preferred darkness. In some aspects, a subjective decision can be made of point darkness versus stroke darkness, and this can be performed as a workaround when the decision does not provide desirable results.

In some cases, ink strokes not containing any segments may be rendered as a point. The point may be equivalent to a single stamp at the start location of the stroke.

Blending and custom dry: dry ink includes the portion of ink that can be rendered by the application, in contrast to the portion that is rendered in the compositor. Custom dry refers to rendering dry ink outside of the compositor. With some types of writing such as solid-color ink, applications may only be allowed to render a stroke once that stroke is completely dry. Because pencil blends stamp by stamp, instead of as a whole stroke, there is an opportunity for pencil to work differently and for parts of an active stroke to be rendered "dry." Breaking a stroke into multiple objects may not cause the resulting strokes to blend or appear different, as long as the texture translation seed is handled correctly. This may be exploited to enable custom dry on partial regions of strokes to reduce costs. The scenario of pencil shading with a long back-and-forth stroke may warrant this type of optimization.

Quantization is not completely avoided with the described algorithms. It may be possible to hit a limit if the individual stamp contributions are low enough. The described algorithm requires the caller (e.g., the user of the system that "calls" application programming interfaces to draw pencil strokes given a set of strokes and parameters such as color, opacity etc.) to be aware of the limitations of increasing stamp density and stamp size. If the user selects a combination of large ink sizes, high stamp density, and low opacity, then rendering may be performed through a high precision intermediate, such as a one channel intermediate with scaling and tiling.

The described stamp spacing algorithm may be adjusted to account for quick opacity changes in the middle of a stroke, for example, to minimize flickering.

Additional optimizations may be performed in the following areas to improve performance of the drawing and rendering techniques: culling, arc segment caching, shader efficiency, and instancing.

In one aspect, one possible performance optimization may include instance drawing. The described techniques may be improved or modified to optimize for memory bandwidth usage. The techniques, as described above, may require uploading six vertices per stamp with seven floats per vertices. This means there is a cost of 42 floats of memory uploads per stamp location. With an instanced based approach, it is possible to reduce the number of floats uploaded per stamp down to three, which can provide a 14× memory bandwidth improvement. The structures would include an input of position and density scale values, and instance data including stamp position, offset, opacity, and seed values. The vertex shader and the pixel shaders would remain unchanged except for the addition of instancing, but would be driven by much more efficient memory bandwidth.

Figure 11:
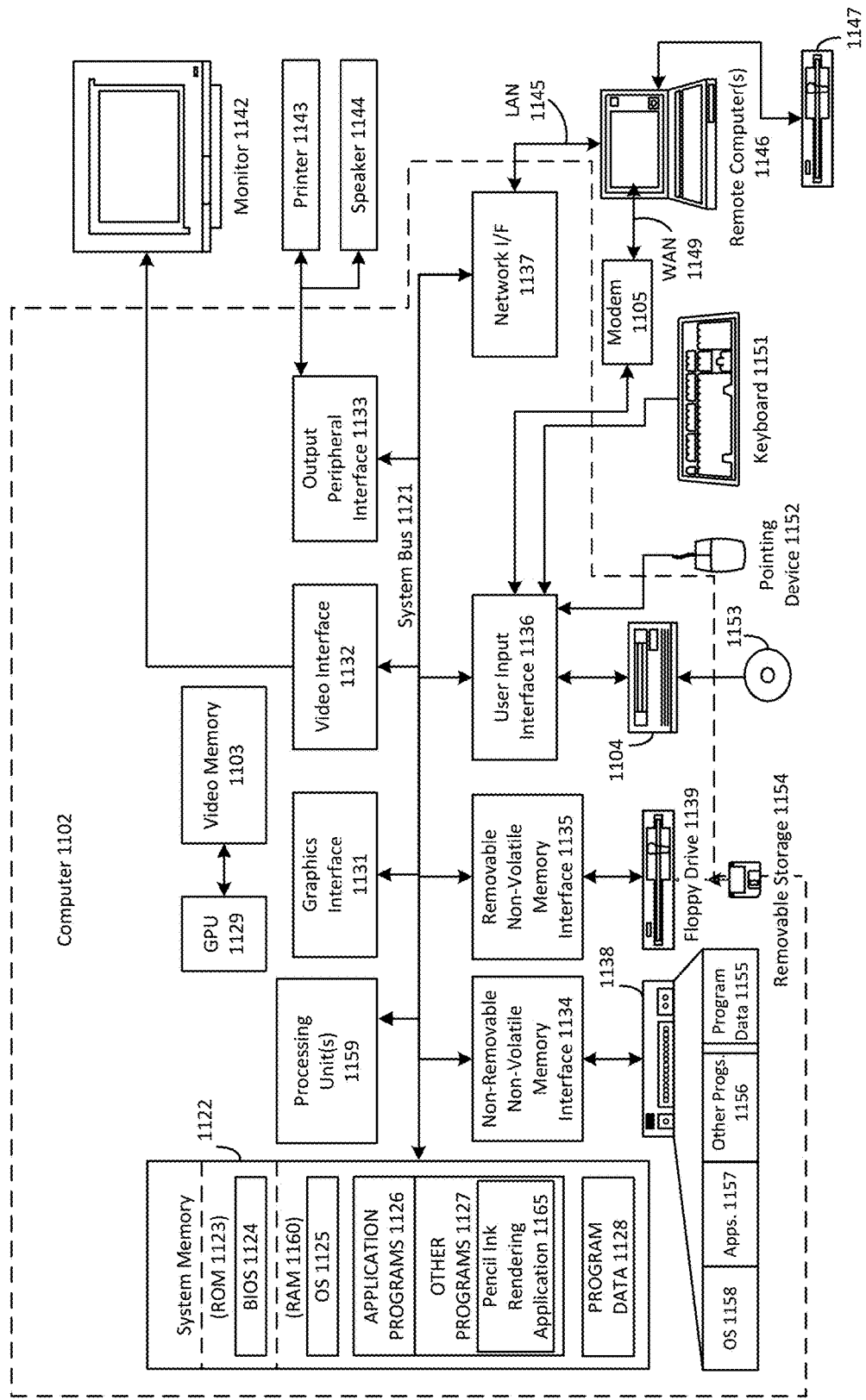
FIG. 11 depicts an example general purpose computing environment in which in which the techniques described herein may be embodied.

The techniques described above, including one or more of the APIs, rendering application, drawing application, and so on, may be implemented on one or more computing devices or environments, as described below. FIG. 11 depicts an example general purpose computing environment in which in which some of the techniques described herein may be embodied. The computing system environment 1102 is only one example of a suitable computing environment and is not intended to suggest any limitation as to the scope of use or functionality of the presently disclosed subject matter. Neither should the computing environment 1102 be interpreted as having any dependency or requirement relating to any one or combination of components illustrated in the example operating environment 1102. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computer 1102, which may include any of a mobile device or smart phone, tablet, laptop, desktop computer, etc., typically includes a variety of computer-readable media. Computer-readable media can be any available media that can be accessed by computer 1102 and includes both volatile and nonvolatile media, removable and non-removable media. The system memory 1122 includes computer-readable storage media in the form of volatile and/or nonvolatile memory such as read only memory (ROM) 1123 and random access memory (RAM) 160. A basic input/output system 1124 (BIOS), containing the basic routines that help to transfer information between elements within computer 1102, such as during start-up, is typically stored in ROM 1123. RAM 1160 typically contains data and/or program modules that are immediately accessible to and/or presently being operated on by processing unit 1159. By way of example, and not limitation, FIG. 11 illustrates operating system 1125, application programs 1126, other program modules 1127, and program data 1128.

The computer 1102 may also include other removable/non-removable, volatile/nonvolatile computer storage media. By way of example only, FIG. 11 illustrates a hard disk drive 1138 that reads from or writes to non-removable, nonvolatile magnetic media, a magnetic disk drive 1139 that reads from or writes to a removable, nonvolatile magnetic disk 1154, and an optical disk drive 1104 that reads from or writes to a removable, nonvolatile optical disk 1153 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 1138 is typically connected to the system bus 1121 through a non-removable memory interface such as interface 1134, and magnetic disk drive 1139 and optical disk drive 1104 are typically connected to the system bus 1121 by a removable memory interface, such as interface 1135.

The drives and their associated computer storage media discussed above and illustrated in FIG. 11, provide storage of computer-readable instructions, data structures, program modules and other data for the computer 1102. In FIG. 11, for example, hard disk drive 1138 is illustrated as storing operating system 1158, application programs 1157, other program modules 1156, and program data 1155. Note that these components can either be the same as or different from operating system 1125, application programs 1126, other program modules 1127, and program data 1128. Operating system 1158, application programs 1157, other program modules 1156, and program data 1155 are given different numbers here to illustrate that, at a minimum, they are different copies. A user may enter commands and information into the computer 1102 through input devices such as a keyboard 1151 and pointing device 1152, commonly referred to as a mouse, trackball or touch pad. Other input devices (not shown) may include a microphone, joystick, game pad, satellite dish, scanner, or the like. These and other input devices are often connected to the processing unit 1159 through a user input interface 1136 that is coupled to the system bus 1121, but may be connected by other interface and bus structures, such as a parallel port, game port or a universal serial bus (USB). A monitor 1142 or other type of display device is also connected to the system bus 1121 via an interface, such as a video interface 1132. In addition to the monitor, computers may also include other peripheral output devices such as speakers 1144 and printer 1143, such as a 3D printer, which may be connected through an output peripheral interface 1133.

The computer 1102 may operate in a networked environment using logical connections to one or more remote computers, such as a remote computer 1146. The remote computer 1146 may be a personal computer, a server, a router, a network PC, a peer device or other common network node, and typically includes many or all of the elements described above relative to the computer 1102, although only a memory storage device 1147 has been illustrated in FIG. 11. The logical connections depicted in FIG. 11 include a local area network (LAN) 1145 and a wide area network (WAN) 1149, but may also include other networks. Such networking environments are commonplace in offices, enterprise-wide computer networks, intranets and the Internet.

When used in a LAN networking environment, the computer 1102 is connected to the LAN 1145 through a network interface or adapter 1137. When used in a WAN networking environment, the computer 1102 typically includes a modem 1105 or other means for establishing communications over the WAN 1149, such as the Internet. The modem 1105, which may be internal or external, may be connected to the system bus 1121 via the user input interface 1136, or other appropriate mechanism. In a networked environment, program modules depicted relative to the computer 1102, or portions thereof, may be stored in the remote memory storage device. By way of example, and not limitation, FIG. 11 illustrates remote application programs 1148 as residing on memory device 1147. It will be appreciated that the network connections shown are example and other means of establishing a communications link between the computers may be used.

In some aspects, other programs 1127 may include a pencil ink rendering application 1165 that includes the functionality as described above. In some cases, pencil ink rendering application 1165 may execute some or all operations of processes 700, 800, 900, and/or 1000.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage. The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments.

Accordingly, the present disclosure may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the disclosure. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of certain of the disclosure.

What is claimed is:

1. A method for rendering variable opacity ink strokes on a touchscreen device, the method comprising:
    receiving a touch input on a touchscreen of a device, wherein the touch input comprises a stroke and is associated with variable opacity;
    converting the stroke to a plurality of segments, wherein the plurality of segments comprises a plurality of arc segments, line segments, or a combination thereof;
    generating a plurality of stamps corresponding to the plurality of segments;
    applying shading to the stroke, where applying shading comprises varying at least one of a weight or an offset of at least one color associated with at least one pixel of at least one stamp of the plurality of stamps;
    rendering the plurality of stamps on the touchscreen of the device to represent the stroke;
    receiving a touch input indicative of an erasure of part of the stroke;
    in response to receiving the touch input, splitting the stroke into a first stroke and a second stroke;
    determining an intra-stroke variation value of the stroke corresponding to a location of where the touch input stopped; and
    associating the intra-stroke variation value with the second stroke.

2. The method of claim 1, wherein varying at least one of the weight or the offset of the at least one color associated with the at least one pixel of the at least one stamp of the plurality of stamps is based on a pressure associated with the pixel and a distance of the pixel from the center of the stamp.

3. The method of claim 1, wherein varying at least one of the weight or the offset of the at least one color associated with the at least one pixel of the at least one stamp of the plurality of stamps is based thickness of the stroke.

4. The method of claim 1, further comprising:
    combining the plurality of stamps with a static texture and a varying texture.

5. The method of claim 4, wherein varying at least one of the weight or the offset of the at least one color associated with the at least one pixel of the at least one stamp of the plurality of stamps is performed independently of at least one of the static texture or the varying texture.

6. The method of claim 1, wherein associating the intra-stroke variation value with the second stroke further comprises:
    evaluating the intra-stroke variation value at a location in the stroke corresponding to the received erasure input.

7. A system, comprising:
    a touchscreen configured to receiving a touch input comprising a stroke associated with variable opacity;
    a processor communicatively coupled to the touchscreen; and
    memory communicatively coupled to the processor, wherein the system is programmed to perform the following operations:
    receiving a touch input on the touchscreen, wherein the touch input comprises a stroke and is associated with variable opacity;
    converting the stroke to a plurality of segments, wherein the plurality of segments comprises a plurality of arc segments, line segments, or a combination thereof;
    generating a plurality of stamps corresponding to the plurality segments;
    applying shading to the stroke, where applying shading comprises varying at least one of a weight or an offset of at least one color associated with at least one pixel of at least one stamp of the plurality of stamps, the weight or offset varied based on pressure and distance of the at least one pixel from a center of the at least one stamp;
    combining the plurality of stamps with a static texture and a varying texture; and
    rendering the plurality of stamps on the touchscreen to represent the stroke.

8. The system of claim 7, wherein varying at least one of the weight or the offset of the at least one color associated with the at least one pixel of the at least one stamp of the plurality of stamps is based on thickness of the stroke.

9. The system of claim 7, wherein varying at least one of the weight or the offset of the at least one color associated with the at least one pixel of the at least one stamp of the plurality of stamps is performed independently of at least one of the static texture or the varying texture.

10. The system of claim 7, wherein the system is programmed to perform the following operations:
    receiving a touch input corresponding to erasing part of the stroke; and
    in response to receiving the touch input, splitting the stroke into a first stroke and a second stroke, wherein the stroke is associated with an intra-stroke variation value; and wherein splitting the stroke into the first stroke and the second stroke further comprises:
    associating the intra-stroke variation value with the second stroke.

11. The system of claim 10, wherein associating the intra-stroke variation value with the second stroke further comprises:

evaluating the intra-stroke variation value at a location in the stroke corresponding to the received erase input.

12. A non-transitory computer-readable storage medium comprising instructions that, when executed by a processor of a computing device, cause the computing device to perform operations comprising:
   receiving a touch input on a touchscreen, wherein the touch input comprises a stroke and is associated with variable opacity;
   converting the stroke to a plurality of segments, wherein the plurality of segments comprises a plurality of arc segments, line segments, or a combination thereof;
   generating a plurality of stamps corresponding to the plurality segments;
   applying shading to the stroke, where applying shading comprises varying at least one of a weight or an offset of at least one color associated with at least one pixel of at least one stamp of the plurality of stamps, the weight or offset varied based on pressure and distance of the at least one pixel from a center of the at least one stamp;
   combining the plurality of stamps with a static texture and a varying texture; and
   rendering the plurality of stamps on the touchscreen to represent the stroke.

13. The non-transitory computer-readable storage medium of claim 12, wherein varying at least one of the weight or the offset of the at least one color associated with the at least one pixel of the at least one stamp of the plurality of stamps is based on a pressure associated with the pixel and a distance of the pixel from the center of the stamp.

14. The non-transitory computer-readable storage medium of claim 12, wherein varying at least one of the weight or the offset of the at least one color associated with the at least one pixel of the at least one stamp of the plurality of stamps is based on thickness of the stroke.

15. The non-transitory computer-readable storage medium of claim 12, wherein varying at least one of the weight or the offset of the at least one color associated with the at least one pixel of the at least one stamp of the plurality of stamps is performed independently of at least one of the static texture or the varying texture.

16. The non-transitory computer-readable storage medium of claim 12, further comprising instructions that, when executed by the processor of the computing device, cause the computing device to perform operations comprising:
   receiving a touch input corresponding to erasing part of the stroke; and
   in response to receiving the touch input, splitting the stroke into a first stroke and a second stroke, wherein the stroke is associated with an intra-stroke variation value; and wherein splitting the stroke into the first stroke and the second stroke further comprises:
   associating the intra-stroke variation value with the second stroke.

* * * * *